United States Patent
Woodward

(10) Patent No.: US 12,292,098 B2
(45) Date of Patent: May 6, 2025

(54) ROTATING GEAR DRIVE AND ASSOCIATED SYSTEMS, COMPONENTS, AND METHODS

(71) Applicant: GIG Energy LLC, Provo, UT (US)

(72) Inventor: Jon Woodward, Mapleton, UT (US)

(73) Assignee: GIG Energy LLC, Provo, UT (US)

( * ) Notice: Subject to any disclaimer, the term of this patent is extended or adjusted under 35 U.S.C. 154(b) by 0 days.

(21) Appl. No.: 18/453,210

(22) Filed: Aug. 21, 2023

(65) Prior Publication Data

US 2025/0067322 A1    Feb. 27, 2025

(51) Int. Cl.
    *F16H 1/46*          (2006.01)
    *F16H 3/48*          (2006.01)
    *F16H 1/28*          (2006.01)

(52) U.S. Cl.
    CPC ............... *F16H 1/46* (2013.01); *F16H 3/48* (2013.01); *F16H 2001/2881* (2013.01)

(58) Field of Classification Search
    CPC ............... F16H 1/46; F16H 2001/289; F16H 2001/2881; F16H 3/44; F16H 2003/442; F16H 3/46; F16H 3/48; F16H 3/60; F16H 2048/104; F16H 2057/085
    USPC ............ 475/332, 330, 339, 340, 341, 342, 5
    See application file for complete search history.

(56) References Cited

U.S. PATENT DOCUMENTS

| | | | | |
|---|---|---|---|---|
| 4,366,727 | A * | 1/1983 | Jonsson | F16H 1/46 475/342 |
| 4,963,108 | A * | 10/1990 | Koda | B63H 5/10 416/129 |
| 4,994,002 | A * | 2/1991 | Valotto | F16H 47/04 475/72 |
| 7,651,255 | B2 * | 1/2010 | Ito | A61B 1/0669 475/5 |
| 8,454,467 | B2 * | 6/2013 | Meise | F16H 47/04 475/82 |
| 2004/0209722 | A1 * | 10/2004 | Ai | F16H 3/727 475/5 |
| 2015/0031488 | A1 * | 1/2015 | Okuda | B60K 6/448 475/5 |
| 2015/0267777 | A1 * | 9/2015 | Shin | F16H 1/46 475/332 |

* cited by examiner

*Primary Examiner* — Roger L Pang
(74) *Attorney, Agent, or Firm* — TraskBritt

(57) ABSTRACT

A gear drive includes a first rotational input coupled to a first planetary gear set. The gear drive further includes a second planetary gear set rotationally coupled to the first planetary gear set. The gear drive also includes a second sun gear of the second planetary gear set coupled to a first output. The gear drive further includes a second ring gear of the second planetary gear set coupled to a second output.

20 Claims, 23 Drawing Sheets

ROTATING GEAR DRIVE AND ASSOCIATED SYSTEMS, COMPONENTS, AND METHODS

TECHNICAL FIELD

Embodiments of the present disclosure generally relate to gear drives or gear boxes. In particular, embodiments of the present disclosure relate to counter rotating gear drives or gear boxes and associated systems, components, and methods.

BACKGROUND

Gear drives or gear boxes are used to modify a force or energy input into the gear drive. For example, gear drives may be used to create a mechanical advantage, such as a force or torque multiplier. A relatively small force or torque may be input into the gear drive. The gear drive may include multiple gears of different sizes interfacing with one another through a mesh between teeth of the multiple gears and/or shafts coupled between gears, such that an output from the gear drive may be a larger force or torque than the input force or torque. In another example, the gear drive may modify a rotational speed of an input. The input may be a relatively low speed and the multiple different sized gears within the gear drive may cause an output of the gear drive to have a higher rotational speed than the input.

Gear drives and/or gear boxes are used in many different applications. For example, a transmission and/or differential in an automobile as well as in other vehicles each use different types of gear boxes to obtain mechanical advantages and/or speed differences to efficiently transfer mechanical energy from the motor (e.g., internal combustion engine, electric motor, etc.) to the tires to cause the vehicle to move. Gear drives and/or gear boxes may also be used in or in association with an electrical generator to increase a rotational speed of the input from the power input, such as from a wind turbine, steam turbine, internal combustion engine, etc., to the rotor of the electric generator to increase the amount of power generated and improve the efficiency of the electrical generator.

BRIEF SUMMARY

Embodiments of the disclosure include a gear drive. The gear drive includes a first planetary gear set and a second planetary gear set. The gear drive further includes a first carrier of the first planetary gear set coupled to a gear of the second planetary gear set. The gear drive also includes a first output operatively coupled to the second planetary gear set, the first output configured to rotate in a first direction. The gear drive further includes a second output operatively coupled to the second planetary gear set, the second output configured to rotate in a second direction opposite the first direction.

Another embodiment of the disclosure includes a method of transferring motion. The method includes receiving a rotational input in a first direction. The method further includes rotating at least one gear of a planetary gear set in the first direction. The method also includes rotating a second at least one gear of the planetary gear set in a second direction opposite the first direction. The method further includes rotating a first output in the first direction. The method also includes rotating a second output in the second direction.

Another embodiment of the disclosure includes a gear drive. The gear drive includes a first rotational input coupled to a first planetary gear set. The gear drive further includes a second planetary gear set rotationally coupled to the first planetary gear set through at least two intermediate connections. The gear drive also includes a first intermediate connection of the at least two intermediate connections coupled between a first element of the first planetary gear set and a second element of the second planetary gear set. The gear drive further includes a second intermediate connection of the at least two intermediate connections coupled between a third element of the first planetary gear set and a fourth element of the second planetary gear set.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
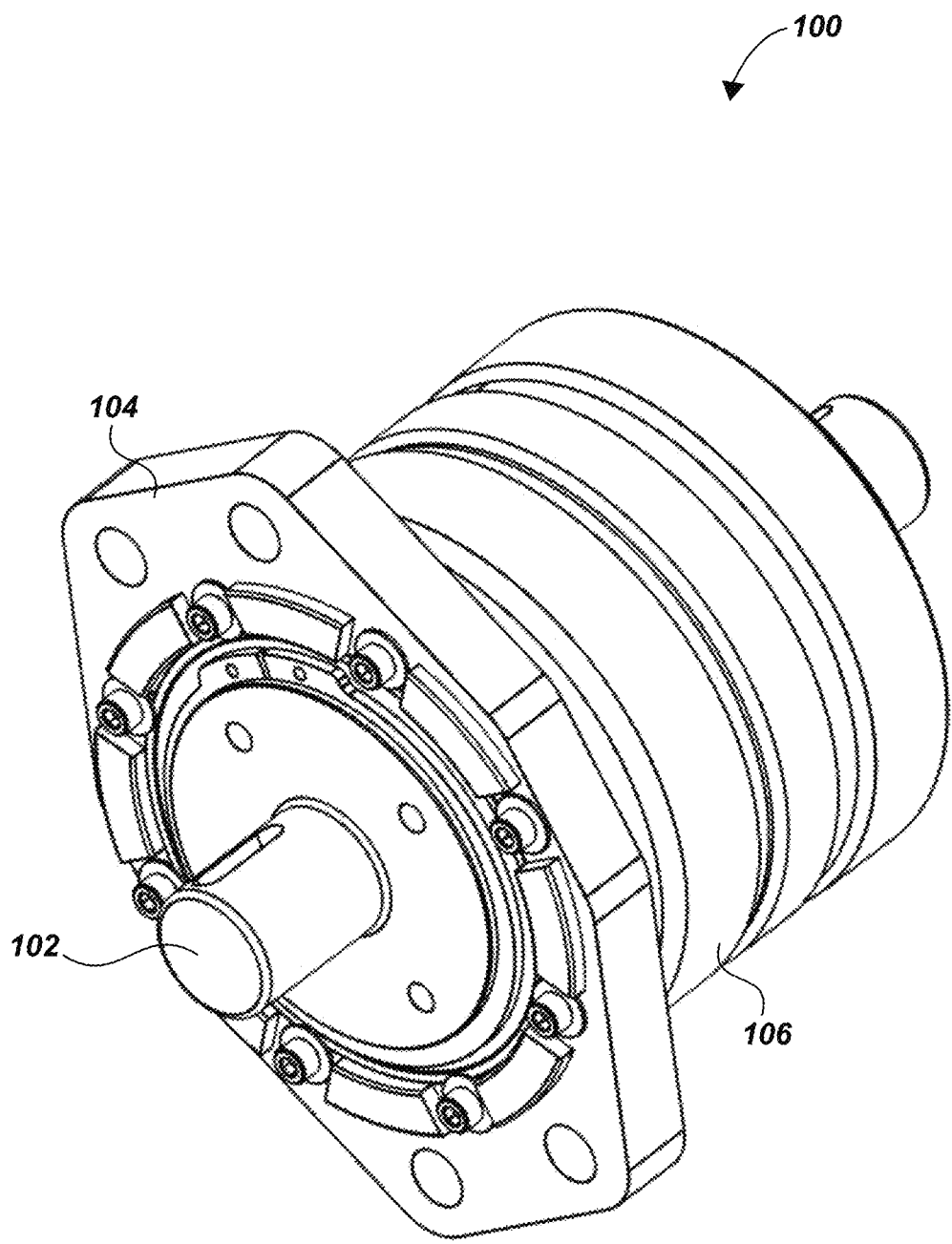
FIGS. 1 and 2 illustrate a perspective views of a gear drive in accordance with embodiments of the disclosure.

The illustrations presented herein are not meant to be actual views of any particular gear drive or component thereof, but are merely idealized representations employed to describe illustrative embodiments. The drawings are not necessarily to scale.

As used herein, the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As described above, gear drives and/or gear boxes are used in many different applications. The mechanical advantages or speed modifications may be determined by a size difference between gears in the associated gear drive. The size difference is often captured as a difference in the number of teeth on each gear. For example, a large gear (e.g., large diameter gear) and a small gear (e.g., small diameter gear) may have teeth that are substantially the same size. This may result in the large gear having a larger number of teeth than the small gear. An interface of the teeth between the small gear and the large gear may result in the small gear rotating multiple times for every rotation of the large gear. Thus, if a rotational input is coupled to the large gear and an output is coupled to the small gear, the output would rotate multiple times for every rotation of the input. Similarly, a torque input into the small gear would be multiplied at an output from the large gear due to the difference in diameter of the large gear while the output from the large gear would have a slower rotational speed than the input.

As the size difference between gears increases the size of the gear drive also increases, such that larger gear ratios result in large gear drives that may be difficult to install in smaller applications. Some types of gears assemblies are able to achieve larger gear ratios in smaller packages. For example, planetary gear sets are able to achieve larger gear ratios due to an interface between multiple nested gears.

Figure 2:
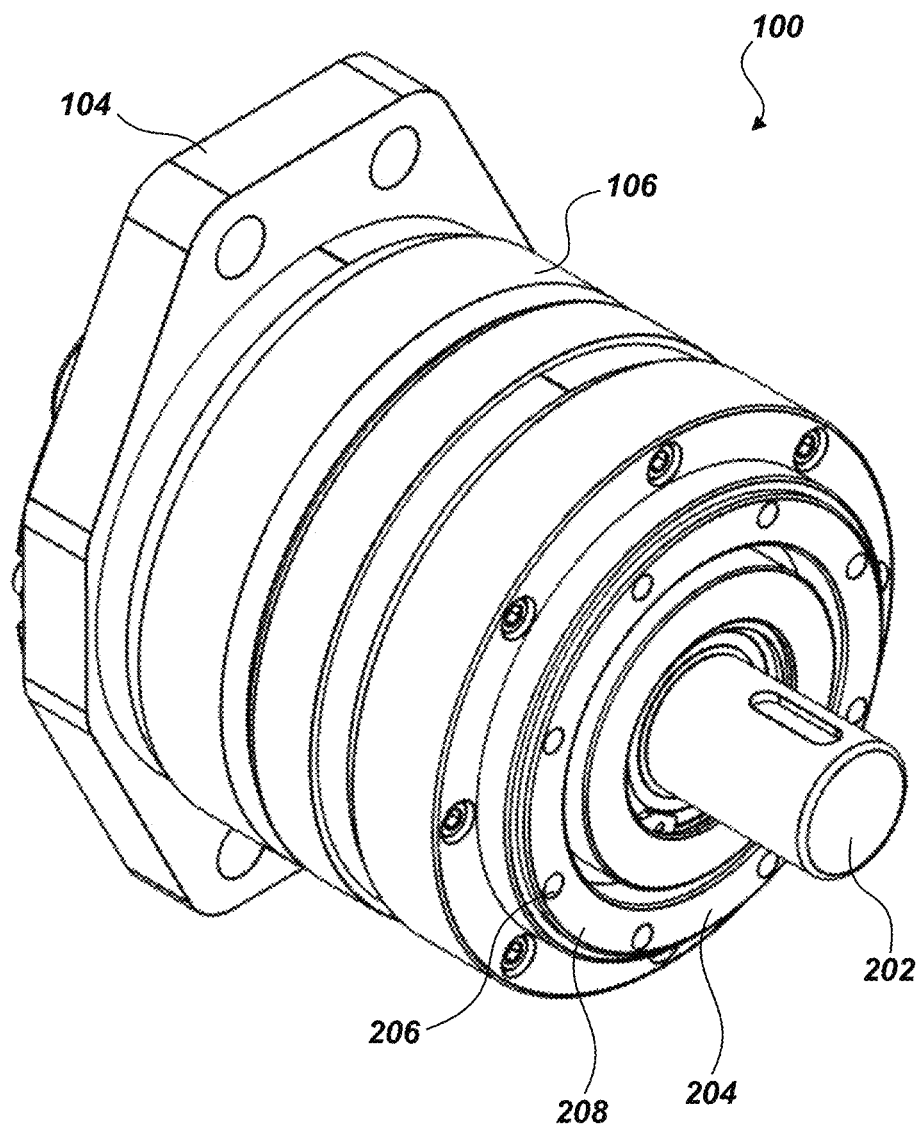

FIGS. 1 and 2 illustrate isometric views of another embodiment of a gear drive 100. The gear drive 100 may be configured to receive a single input through an input 102. The input 102 may be a shaft coupled to internal gears in the gear drive 100. The gear drive 100 may also include a housing 106. The housing 106 may form an outer case configured to house (e.g., surround) the internal gears of the gear drive 100. The housing 106 may shield the internal gears from debris and other damage causing elements. The housing 106 may also be configured to maintain internal fluid, such as lubricants (e.g., oil, grease, etc.) within the housing 106 to reduce the wear on the internal gears, reduce friction losses in the internal gears, and extend the life of the internal gears. As described in further detail below, the housing 106 may be directly coupled to one or more of the internal gears to transfer motion to the internal gears and/or secure the internal gears relative to other internal gears.

The gear drive 100 may be suspended from one or more brackets 104. The brackets 104 may be configured to mount and/or secure the gear drive 100 relative to a relatively stationary component. For example, if the gear drive 100 is mounted to an automobile or other vehicle, the brackets 104 may mount the gear drive 100 to a frame or body component of the vehicle that is stationary relative to the vehicle, such that the moving component of the vehicle that is coupled to the input 102 may move or rotate relative to the relatively stationary component. In some embodiments, the brackets 104 are configured to secure the housing in all directions (e.g., rotationally, radially, and axially). In other embodiments, the brackets 104 are configured to facilitate rotation of the housing 106, while securing the housing 106 in other directions (e.g., axially and radially). For example, the housing 106 may be rotatably coupled to the brackets 104 through one or more bearings (e.g., roller bearings, ball bearings, needle bearings, etc.).

FIG. 1 illustrates a perspective view of an output side of the gear drive 100. The gear drive 100 may include a first output 202 and a second output 204. The first output 202 and the second output 204 may rotate in opposite directions. The first output 202 may rotate in a same direction as the input 102 and the second output 204 may rotate in a second opposite direction. Thus, the gear drive 100 outputs distinct counter rotating outputs from a single input in a single direction.

Figure 3:
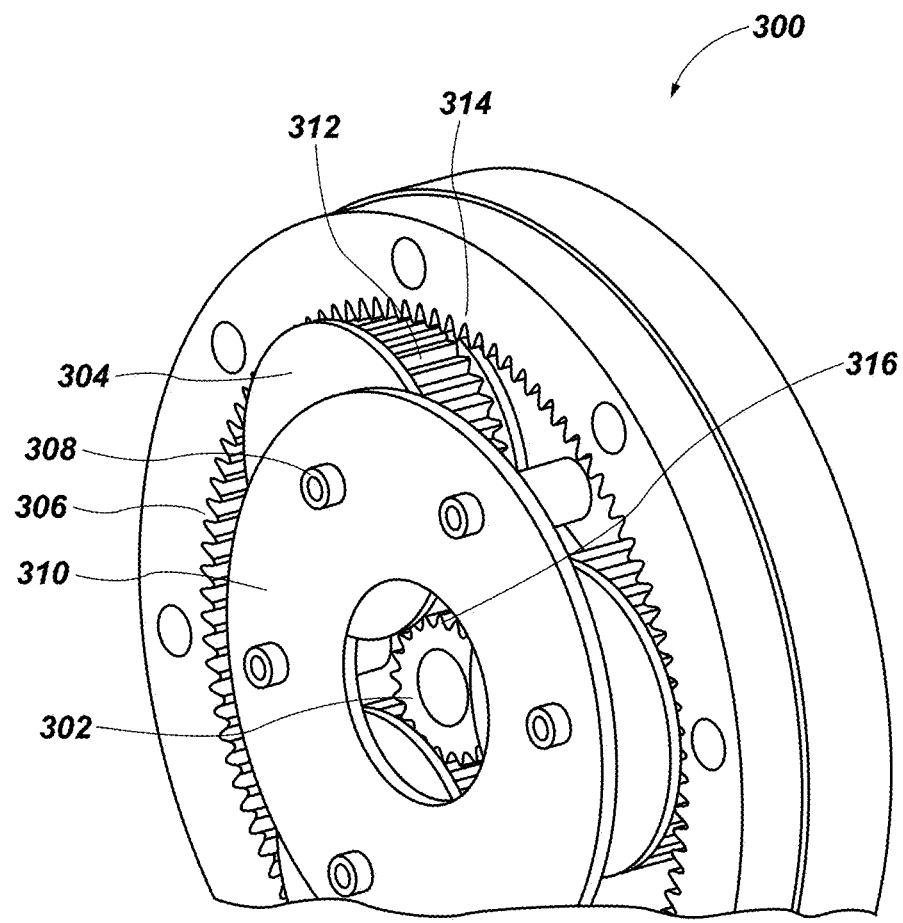
FIG. 3 illustrates a perspective view of a planetary gear in accordance with embodiments of the disclosure.

The internal gears of the gear drive 100 may be planetary gears. FIG. 3 illustrates a perspective view of a planetary gear 300. The planetary gear 300 includes a ring gear 306, planet gears 304, and a sun gear 302. The planet gears 304 may be coupled together by a carrier 310, such that the planet gears 304 move together between the ring gear 306 and the sun gear 302. The carrier 310 may be coupled to each of the planet gear 304 through spindles 308. The planet gears 304 may rotate about the spindles 308 while the carrier 310 rotates relative to the ring gear 306 and the sun gear 302. The ring gear 306 may include inward facing teeth 314, which may interface with teeth 312 of the planet gears 304. The teeth 312 of the planet gears 304 may subsequently interface with teeth 316 of the sun gear 302. Thus the planet gears 304 may transfer motion to at least one of the ring gear 306 and the sun gear 302. In some cases the planet gears 304 may transfer motion between the ring gear 306 and the sun gear 302.

Conventionally, one of the ring gear 306, the carrier 310, or the sun gear 302 is held stationary while the other two of the ring gear 306, the carrier 310, and the sun gear 302 is attached to a rotational input or a rotational output. The gear ratio of the planetary gear 300 is based on a difference in a number of teeth 314 in the ring gear 306 (R) and a number of teeth 316 in the sun gear 302 (S). The gear ratio also changes based on which of the ring gear 306, carrier 310, or sun gear 302 is held stationary. For example, if the ring gear 306 is held stationary the gear ratio is:

$$\frac{S}{R+S}$$

If the sun gear 302 is held stationary the gear ratio is:

$$\frac{R}{R+S}$$

If the carrier 310 is held stationary the gear ratio is:

$$\frac{S}{R}$$

In some instances, all three of the ring gear 306, the carrier 310, and the sun gear 302 may rotate. For example, two inputs and/or two outputs, may result in a single input coupled to one of the ring gear 306, the carrier 310, or the sun gear 302 and each of two outputs being coupled to one of the remaining ring gear 306, carrier 310, or sun gear 302. Alternatively, two inputs may be coupled to two of the ring gear 306, the carrier 310, or the sun gear 302 and an output may be coupled to the remaining ring gear 306, carrier 310, or sun gear 302. If all three of the ring gear 306, carrier 310, and sun gear 302 are rotating the gear ratio may be larger. The relative rotation of each of the ring gear 306, carrier 310, and the sun gear 302 become a function of the relative rotational speeds of the other components. For example, if the ring gear 306 and the carrier 310 rotate independently, the rotational speed of the sun gear 302 is determined as follows:

$$Ts = \frac{(R+S)Ty - TrR}{S}$$

Where Ts is the rotational speed of the sun gear 302, Ty is the rotational speed of the carrier 310 and Tr is the rotational speed of the ring gear 306. If the ring gear 306 and the carrier 310 are rotating in opposite directions, the ratio increases significantly. For example, rotating the ring gear 306 and the carrier 310 in opposite directions may result in gear ratios of greater than 9:1, such as greater than 10:1 or greater than 12:1. Therefore, rotating the ring gear 306 and the carrier 310 in opposite directions through separate inputs may increase the output speed of the sun gear 302 relative to conventional applications.

Figure 4:
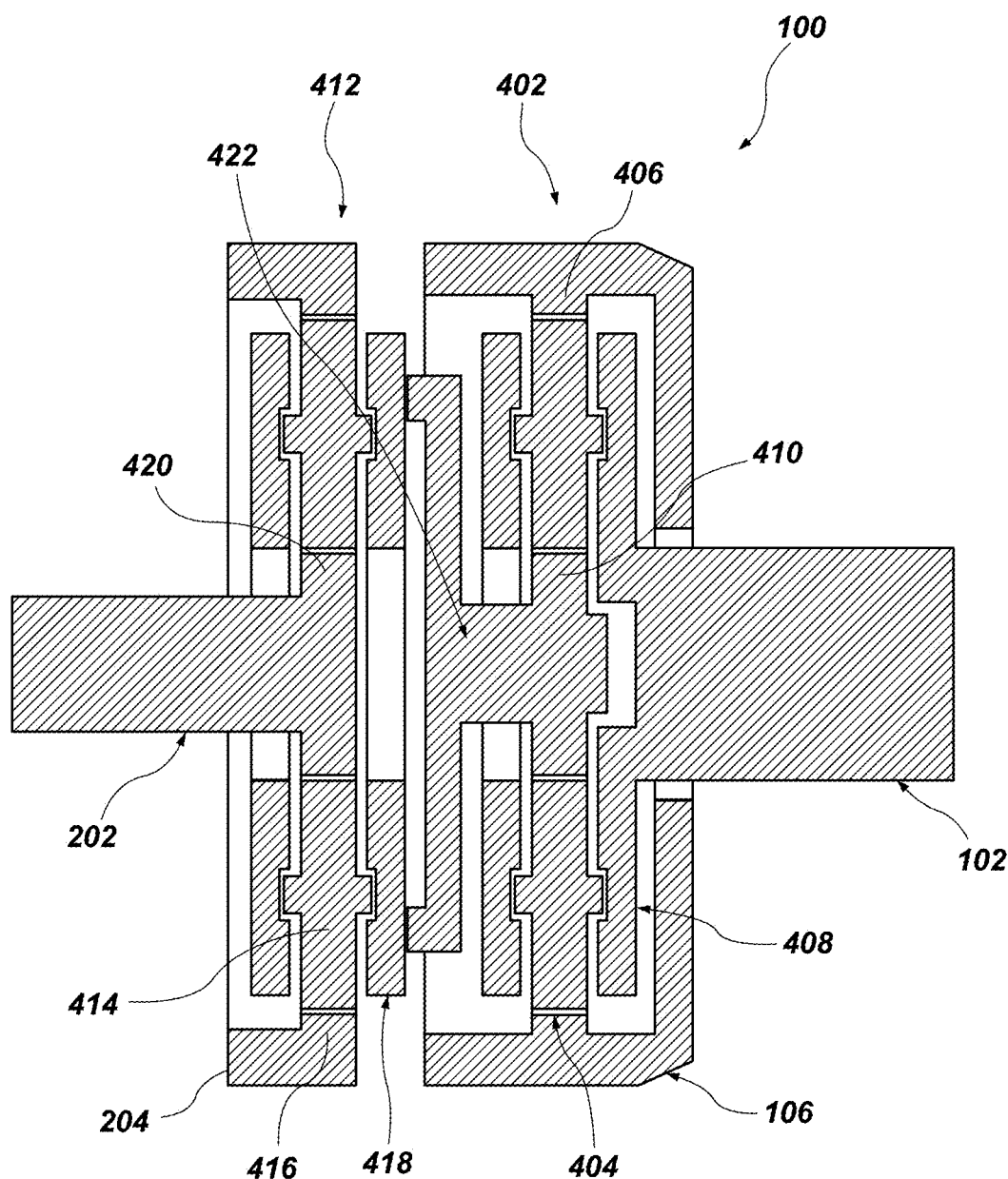
FIG. 4 illustrates a simplified cross-sectional view of the gear drive of FIGS. 1 and 2.
Figure 5:
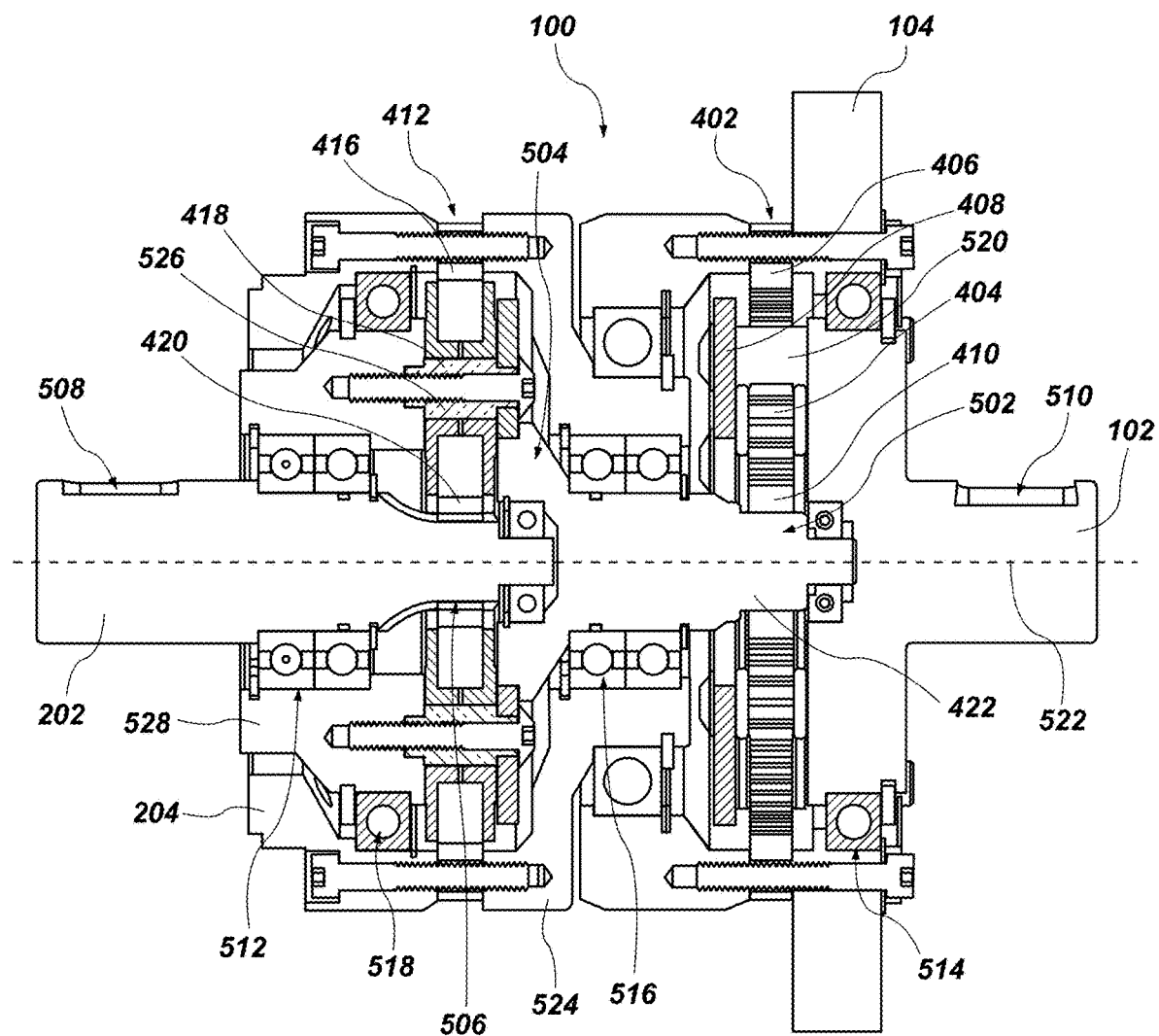
FIG. 5 illustrates a cross-sectional view of an embodiment of the gear drive of FIGS. 1 and 2.
Figure 6:
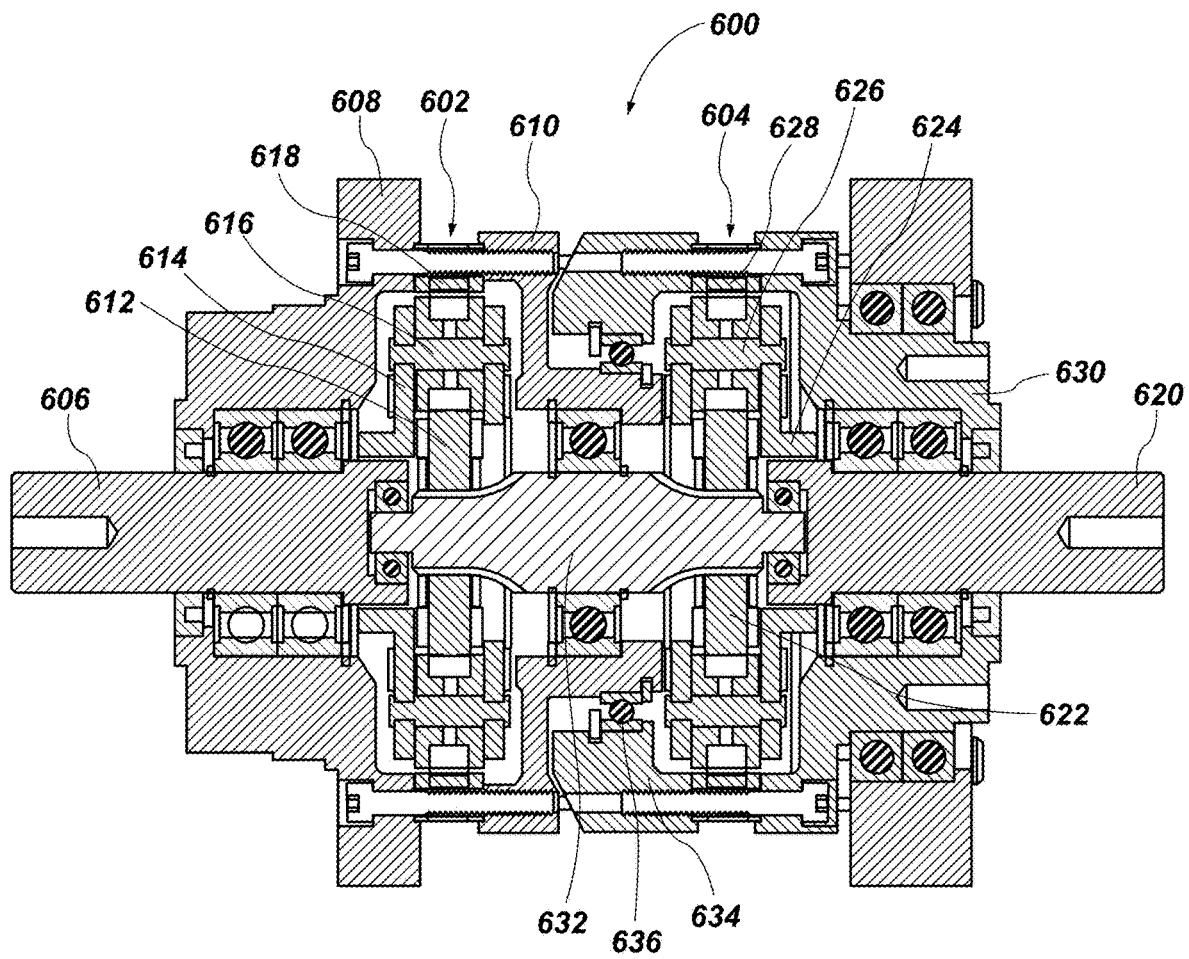
FIGS. 6 through 20 illustrate cross-sectional views of embodiments of a gear drive in accordance with embodiments of the disclosure.

FIG. 4 and FIG. 5 illustrate cross-sectional views of an embodiment of an arrangement of the internal gears of the gear drive 100. FIG. 4 illustrates a simplified cross-section of the gear drive 100. As illustrated in both FIGS. 8 and 9, the input 102 is coupled to a first carrier 408 of a first planetary gear set 402. Thus, the first carrier 408 rotates at substantially the same speed and in substantially the same direction as the input 102. A first ring gear 406 of the first planetary gear set 402 is secured to the housing 106 of the gear drive 100, such that the first ring gear 406 is substantially fixed relative to the first carrier 408. Thus, planet gears 404 of the first planetary gear set 402 cause a first sun gear 410 of the first planetary gear set 402 to rotate in a same direction as the first carrier 408. A speed of the rotation of the first sun gear 410 may be defined by a relationship between the number of teeth in the first ring gear 406 and the first sun gear 410, as discussed in further detail above.

The first planetary gear set 402 may be coupled to a second planetary gear set 412 through an intermediate shaft 422. In some embodiments, the intermediate shaft 422 is coupled between the first sun gear 410 and a second carrier 418 of the second planetary gear set 412, such that the second carrier 418 rotates in substantially the same direction and at substantially the same speed as the first sun gear 410. A second ring gear 416 of the second planetary gear set 412 may be configured to rotate relative to the first planetary gear set 402. Thus, planet gears 414 of the second carrier 418 may cause a second sun gear 420 of the second planetary gear set 412 to rotate in a same direction as the second carrier 418 and may also cause the second ring gear 416 to rotate in a direction opposite the second carrier 418 and the second sun gear 420. Because the second carrier 418 is rotating in a same direction as the first sun gear 410, which is rotating in a same direction as the input 102, the second sun gear 420 rotates in substantially a same direction as the input 102.

The second sun gear 420 may be coupled to the first output 202 of the gear drive 100 and the second ring gear 416 may be coupled to the second output 204. Thus, the first output 202 may rotate in substantially a same direction as the input 102 and the second output 204 may rotate in a direction opposite the first output 202.

FIG. 5 illustrates a detailed cross-section of the gear drive 100. As illustrated in the embodiment of FIG. 5, the input 102 is coupled directly to the first carrier 408. In other embodiments, additional interface components, such as a coupler or an adapter plate, may be utilized to couple the input 102 to the first carrier 408. The input 102 and any additional interface components may be rotatably secured to the housing 106 through one or more bearings 514. The bearings 514 may be configured to facilitate substantially free rotation of the input 102 and additional interface components relative to the housing 106 and brackets 104. In the embodiment illustrated in FIG. 5, the first ring gear 406 is rotationally secured to the housing 106 and/or the brackets 104, such that the first ring gear 406 does not rotate relative to the housing 106 or the brackets 104.

The first carrier 408 driven by the input 102 moves the planet gears 404 about an axis 522 of the first planetary gear set 402 through planet gear axles 520 which secure the planet gears 404 to the first carrier 408. The rotation of the first carrier 408 causes the planet gears 404 to rotate due to an interface between teeth of the planet gears 404 and teeth in the stationary first ring gear 406. The teeth of the planet gears 404 also interface with teeth in the first sun gear 410, such that the rotation of the planet gears 404 caused by the rotation of the first carrier 408 and the interface between the teeth of the planet gears 404 and the teeth of the first ring gear 406 cause the first sun gear 410 to rotate.

In the embodiment illustrated in FIG. 5, the first sun gear 410 is operatively coupled to the second carrier 418 through the intermediate shaft 422. The first sun gear 410 may transfer rotation to the intermediate shaft 422 through an interface 502 between a first end of the intermediate shaft 422 and the first sun gear 410. The interface 502 may be configured to rotationally secure first end of the intermediate shaft 422 to the first sun gear 410. The interface 502 may include a high friction interface, such as an interference fit, complementary geometry, such as intermeshing teeth or splines, or a hardware connection, such as a key and keyway, pins, bolts, screws, studs, etc. One or more bearings 516 may be positioned between the intermediate shaft 422 and a surrounding structure, such as an output support structure 524. The one or more bearings 516 may be configured to facilitate substantially free rotation of the intermediate shaft 422 and/or the surrounding structure relative to one another. The intermediate shaft 422 may be coupled to the second carrier 418 on a second end opposite the first end of the intermediate shaft 422 that is coupled to the first carrier 408. In some embodiments, the intermediate shaft 422 is coupled to the second carrier 418 through a collar 504. The collar 504 may be formed as part of the intermediate shaft 422 or may be a separate component coupled between the intermediate shaft 422 and the second carrier 418. The collar 504 extends radially away from a central axis 522 of the intermediate shaft 422 to couple the intermediate shaft 422 to the second carrier 418. The collar 504 may be coupled to the second carrier 418 through an interface capable of transmitting rotation from the collar 504 to the second carrier 418, such as a high friction interface (e.g., an interference fit), complementary geometry (e.g., intermeshing teeth or splines), or a hardware connection (e.g., a key and keyway, pins, bolts, screws, studs, etc.).

The second carrier 418 driven by the intermediate shaft 422 moves the planet gears 414 about an axis 522 of the second planetary gear set 412 through planet gear axles 526 which secure the planet gears 414 to the second carrier 418.

The rotation of the second carrier 418 may cause the planet gears 414 to rotate due to an interface between teeth of the planet gears 414 and teeth in the second ring gear 416 and teeth in the second sun gear 420. The interface between the teeth of the planet gears 414 and the teeth in the second ring gear 416 causes the second ring gear 416 to rotate in a direction opposite the rotational direction of the second carrier 418 while the interface between the teeth of the planet gears 414 and the teeth of the second sun gear 420 cause the second sun gear 420 to rotate in a same direction as the rotational direction of the second carrier 418.

The second sun gear 420 may be coupled to the first output 202. In some embodiments, the second sun gear 420 is coupled to the first output 202 through an interface 506. The interface 506 may be configured to rotationally secure the first output 202 to the second sun gear 420. The interface 506 may include a high friction interface, such as an interference fit, complementary geometry, such as intermeshing teeth or splines, or a hardware connection, such as a key and keyway, pins, bolts, screws, studs, etc. In other embodiments, the second sun gear 420 may be formed as part of the first output 202. For example, the teeth of the second sun gear 420 may extend radially from a shaft of the first output 202. One or more bearings 512 may be positioned between the first output 202 and adjoining structures, such as a carrier support structure 528, such that the first output 202 and the adjoining structures may rotate substantially freely relative to one another. For example, the bearings 512 may facilitate different rotational speeds between the first output 202 and the carrier support structure 528.

The second ring gear 416 may be coupled to the second output 204. In the embodiment illustrated in FIG. 5, the second ring gear 416 is secured between the second output 204 and an output support structure 524. For example, hardware, such as a bolt, screw, or pin, may extend from the second output 204 through the second ring gear 416 and into the output support structure 524, such that the second ring gear 416 is rotationally secured to both the second output 204 and the output support structure 524. Thus, as the second ring gear 416 rotates due to the interface between the teeth of the second ring gear 416 and the teeth of the planet gears 414 of the second carrier 418, the second ring gear 416 also causes the second output 204 and the output support structure 524 to rotate. As described above, bearings 516 may be positioned between the output support structure 524 and adjoining structures, such as the intermediate shaft 422 and the housing 106. The bearings 516 may facilitate substantially free rotation of the output support structure 524 relative to the adjoining structures. Similarly, bearings 518 may also be positioned between the second output 204 and adjoining structures, such as the carrier support structure 528 to facilitate substantially free rotation of the second output 204 relative to the adjoining structures.

At least one of the first output 202 and the second output 204 may include a shaft. For example, in the embodiment illustrated in FIGS. 6-9, the first output 202 includes a shaft. The shaft of the first output 202 includes a securing structure 508 configured to secure to first output 202 to a rotational input of an adjoining device, such as a generator, fan, propeller, pump, etc. The securing structure 508 may include complementary geometry, such as a flat, splines, or a keyway. In other embodiments, the securing structure 508 may include additional hardware or hardware receiving components, such as pins, bosses, apertures, recesses, etc. The second output 204 may be configured to interface with a collar, cage, or other structure configured to receive a rotational input while facilitating the rotation of the first output 202 radially within the structure. For example, the second output 204 may include multiple interface structures 206 (FIG. 2) extending into or out of an end face 208 (FIG. 2) of the second output 204. The interface structures 206 (FIG. 2) may be configured to secure the second output 204 to the collar, cage, or other structure configured to receive the rotational output, through complementary structures or hardware.

The input 102 may include a shaft configured to receive a rotational input. The shaft of the input 102 includes a securing structure 510 configured to secure to input 102 to a rotational input of an adjoining device, such as a motor, windmill, impeller, etc., or an arm configured to convert a linear input to a rotational input. The securing structure 510 may include complementary geometry, such as a flat, splines, or a keyway. In other embodiments, the securing structure 510 may include additional hardware or hardware receiving components, such as pins, bosses, apertures, recesses, etc.

FIG. 6 illustrates a cross-sectional view of another embodiment of a gear drive 600, similar to the gear drive 100 described above with respect to FIGS. 6-9. The gear drive 600 may include a single input and two counterrotating outputs. The gear drive 600 includes an input shaft 606 configured to receive a single rotational input on a first axial end of the gear drive 600 and a first output shaft 620 and a second output structure 630 on a second axial end of the gear drive 600 opposite the first axial end of the gear drive 600.

A mounting structure 608 on the first axial end of the gear drive 600 may be configured to secure the gear drive 600 to another structure. The input shaft 606 passes through the mounting structure 608, such that the input shaft 606 rotates relative to the mounting structure 608. The input shaft 606 is coupled to a first carrier 614 of a first planetary gear set 602. First planet gears 616 of the first carrier 614 are configured to interface with a first ring gear 618 and a first sun gear 612 of the first planetary gear set 602. The first ring gear 618 is secured to the mounting structure 608, such that the first ring gear 618 is held stationary relative to the other components of the first planetary gear set 602 (e.g., the first carrier 614, first planet gears 616, and the first sun gear 612). The interface between the first planet gears 616 and the first sun gear 612 is configured to cause the first sun gear 612 to rotate in the same direction as the input shaft 606.

The first sun gear 612 is coupled to a second sun gear 622 of a second planetary gear set 604 through an intermediate shaft 632. Thus, the second sun gear 622 may rotate in the same direction and at the same speed as the first sun gear 612. The second sun gear 622 is configured to transmit rotation to the other components of the second planetary gear set 604 through an interface between the second sun gear 622 and second planet gears 626 of a second carrier 624. The interface between the second sun gear 622 and the second planet gears 626 causes the second carrier 624 to rotate in the same direction as the second sun gear 622, which is also the same direction as the input shaft 606. The second planet gears 626 also interfaces with a second ring gear 628. The interface between the second planet gears 626 and the second ring gear 628 causes the second ring gear 628 to rotate in a direction opposite the direction of the direction of the second carrier 624 and the second sun gear 622.

The second carrier 624 is coupled to the first output shaft 620, such that the second carrier 624 causes the first output shaft 620 to rotate in the same direction as the input shaft 606. The second ring gear 628 is coupled to a second output structure 630, such that the second ring gear 628 causes the second output structure 630 to rotate in a direction opposite the direction of the first output shaft 620 and the input shaft 606.

The gear drive 600 may also include ring support structures 610 and 634 configured to support the respective ring gears 618 and 628 and add structural support to the gear drive 600. The first ring support structure 610 is configured to remain stationary being secured to the stationary first ring gear 618 and the mounting structure 608. The second ring support structure 634 is secured to the second ring gear 628 and is configured to rotate relative to the first ring support structure 610. Thus, the first ring support structure 610 and the second ring support structure 634 may overlap and be secured through a bearing 636, such as a ball bearing, a needle bearing, a magnetic bearing, etc. In some embodiments, such as the embodiment illustrated in FIG. 6, the second ring support structure 634 is positioned radially outside the stationary first ring support structure 610. In other embodiments, the stationary first ring support structure 610 may be positioned radially outside the second ring support structure 634.

FIG. 7 illustrates a cross-sectional view of another embodiment of a gear drive 700, similar to the gear drive 100 described above with respect to FIGS. 6-9. The gear drive 700 may include a single input and two counterrotating outputs. The gear drive 700 includes an input 702 configured to receive a single rotational input on a first axial end of the gear drive 700 and a first output 704 and a second output 706 on a second axial end of the gear drive 700 opposite the first axial end of the gear drive 700. The gear drive 700 also includes a housing 708 secured to a mounting structure 710.

Internally, the gear drive 700 includes a first planetary gear set 712 and a second planetary gear set 722. A first ring gear 716 of the first planetary gear set 712 is secured to the housing 708 and the mounting structure 710, such that the first planetary gear set 712 is substantially rotationally fixed. The input 702 is coupled to a first sun gear 720 of the first planetary gear set 712. For example, the first sun gear 720 may be formed as part of the input 702 or may be rotationally secured to the input 702 through an interface, such as an interference fit, splines, intermeshed teeth, hardware connection, or other interface. Teeth of the first sun gear 720 may interface with teeth of planet gears 714 in a first carrier 718. The interface between the first sun gear 720 and the planet gears 714 of the first carrier 718 may cause the first carrier 718 to rotate when a rotational input is received by the input 702. Where the first ring gear 716 is rotationally fixed, the first carrier 718 may rotate in a same rotational direction as the first sun gear 720 and the input 702. A relative speed of the first carrier 718 may be defined based on a relationship between the number of teeth in the first ring gear 716 and the first sun gear 720.

The first carrier 718 may be coupled to the second planetary gear set 722 through an intermediate structure 732. In the embodiment illustrated in FIG. 7, the first carrier 718 is coupled to a second ring gear 726 of the second planetary gear set 722 through the intermediate structure 732. The second ring gear 726 is coupled to the second output 706 of the gear drive 700. Thus, the second ring gear 726 and the second output 706 may rotate in a same direction and at substantially a same speed as the first carrier 718. Teeth of the second ring gear 726 interface with teeth of planet gears 724 of a second carrier 728. The interface between the teeth of the second ring gear 726 and the planet gears 724 of the second carrier 728 may cause the second carrier 728 to rotate in a direction opposite the rotating direction of the second ring gear 726 when the second ring gear 726 is rotated by the intermediate structure 732. The teeth of the planet gears 724 of the second carrier 728 also interface with teeth of a second sun gear 730. The interface between the teeth of the second sun gear 730 and the teeth of the planet gears 724 of the second carrier 728 may cause the second sun gear 730 to rotate in a same direction as the second carrier 728, which is in a direction opposite the rotating direction of the second ring gear 726. The second sun gear 730 may be coupled to the first output 704. For example, the second sun gear 730 may be formed as part of the first output 704 or may be rotationally secured to the first output 704 through an interface, such as an interference fit, splines, intermeshed teeth, hardware connection, or other interface.

Figure 7:
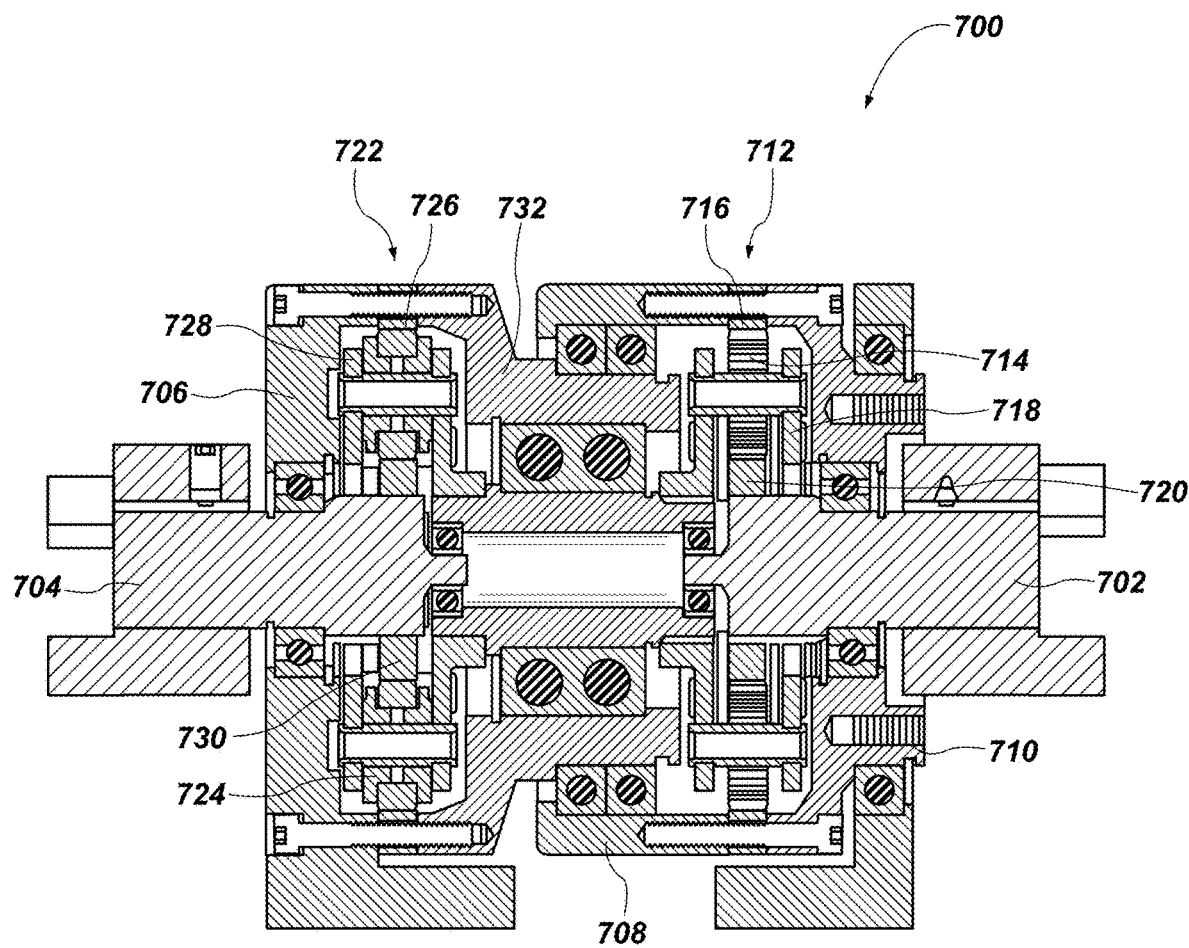

In the embodiment illustrated in FIG. 7, the second output 706 rotates in a same direction as the input 702 and the first output 704 rotates in a direction opposite the rotational direction of the input 702.

As illustrated in FIGS. 1-5, a gear drive may be configured to receive a single rotational input and output two counterrotating rotational outputs. As discussed above, an intermediate linking structure, such as the intermediate shaft 422 or the intermediate structure 732 may transfer rotation between two planetary gear sets to transfer rotation from one component of the first planetary gear set to another component of the second planetary gear set. The use of multiple planetary gear sets may facilitate greater gear ratios such that the two counterrotating outputs rotate at a greater speed with a lower amount of torque than the input or such that the two counterrotating outputs rotate at a lower speed with a higher amount of torque than the input. While the gear drive 100 and the gear drive 700 illustrate two different configurations of the two planetary gear sets and the intermediate structure, additional configurations may also result in the conversion of a single rotational input to two counterrotating outputs. For example, the input may be coupled to a first carrier and the intermediate structure may be coupled between the first sun gear and the second ring gear. In another example, the input may be coupled to the first sun gear and the intermediate structure may be coupled between the first carrier and the second sun gear.

Other embodiments may include additional planetary gear sets, such as three planetary gear sets, four planetary gear sets, five planetary gear sets or more. The additional planetary gear sets may also include additional intermediate structures configured to link components of adjacent planetary gear sets. In some embodiments, the adjacent planetary gear sets may include multiple intermediate structures. In other embodiments, one or more intermediate structures may link components from planetary gear sets that are not adjacent. For example, the housing may couple a component (e.g., carrier, ring gear, or sun gear) from a last planetary gear set to a component of a first planetary gear set, such that the housing may skip over one or more planetary gear sets between the first planetary gear set and the last planetary gear set.

Figure 8:
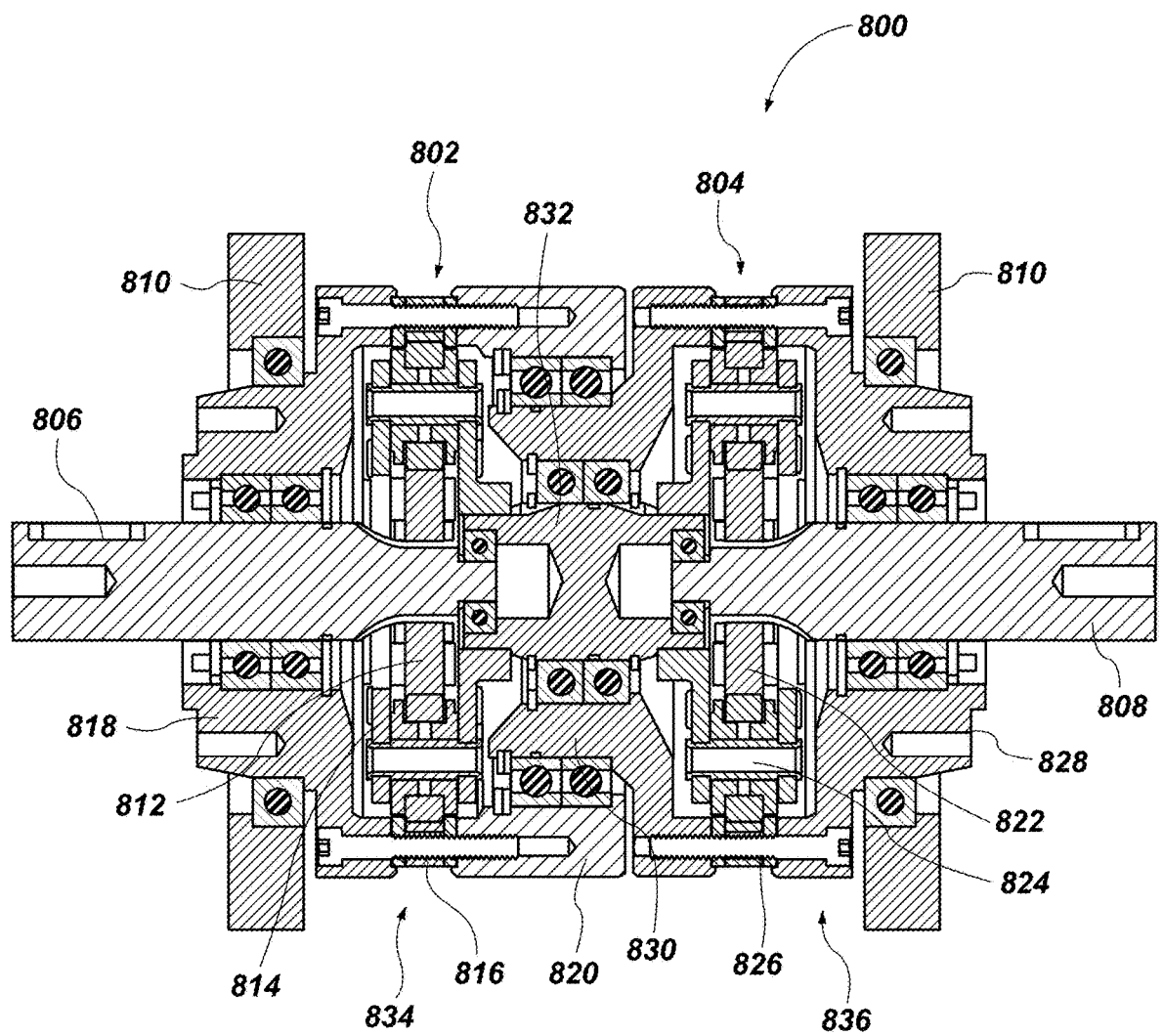

FIG. 8 illustrates a cross-sectional view of another embodiment of a gear drive 800, configured to provide two counter-rotating outputs. The gear drive 800 includes an input shaft 806 configured to receive a rotational input. The input shaft 806 is coupled to a first sun gear 812 of a first planetary gear set 802. The first sun gear 812 is configured to cause a first carrier 814 of the first planetary gear set 802 to rotate in a same direction as the input shaft 806. The first carrier 814 is also configured to interface with a first ring gear 816 of the first planetary gear set 802. The first ring gear 816 is secured to a first hub ring 818 and a rotating housing 820, which may be configured to rotate relative to the gear drive 800 and mounting structures 810 of the gear drive 800. In some embodiments, the first hub ring 818 is coupled to a second rotational input. In other embodiments, the first hub ring 818 is coupled to a control device, such as a generator, regeneration motor, or brake, configured to control a rotational resistance of the first ring gear 816. In other embodiments, the first hub ring 818 may be fixed, such that the first ring gear 816 of the first planetary gear set 802 is fixed.

The first carrier 814 is coupled to a second carrier 824 of a second planetary gear set 804 through an intermediate shaft 832, such that the second carrier 824 rotates at a same speed and same direction as the first carrier 814. The second carrier 824 is configured to interface with a second ring gear 826 and a second sun gear 822 of the second planetary gear set 804 and cause the second ring gear 826 and the second sun gear 822 to rotate in opposite directions. The second sun gear 822 is coupled to an output shaft 808 and the second ring gear 826 is coupled to a second rotating hub 828. The second rotating hub 828 may be configured as a second output, such that the second output rotates in a direction opposite the output shaft 808.

The gear drive 800 includes a split housing having a first housing portion 834 formed by the first hub ring 818 and a rotating housing 820 and a second housing portion 836 formed by the second rotating hub 828 and a ring support structure 830. The first housing portion 834 and the second housing portion 836 may each be configured to rotate relative to the mounting structures 810. The first housing portion 834 and the second housing portion 836 may rotate at different speeds. The ring support structure 830 of the second housing portion 836 may be nested within the rotating housing of the first housing portion 834 in a region between the first planetary gear set 802 and the second planetary gear set 804. The nested connection between the first housing portion and the second housing portion may be configured to limit radial and axial movement of the first planetary gear set 802 relative to the second planetary gear set 804.

Figure 9:
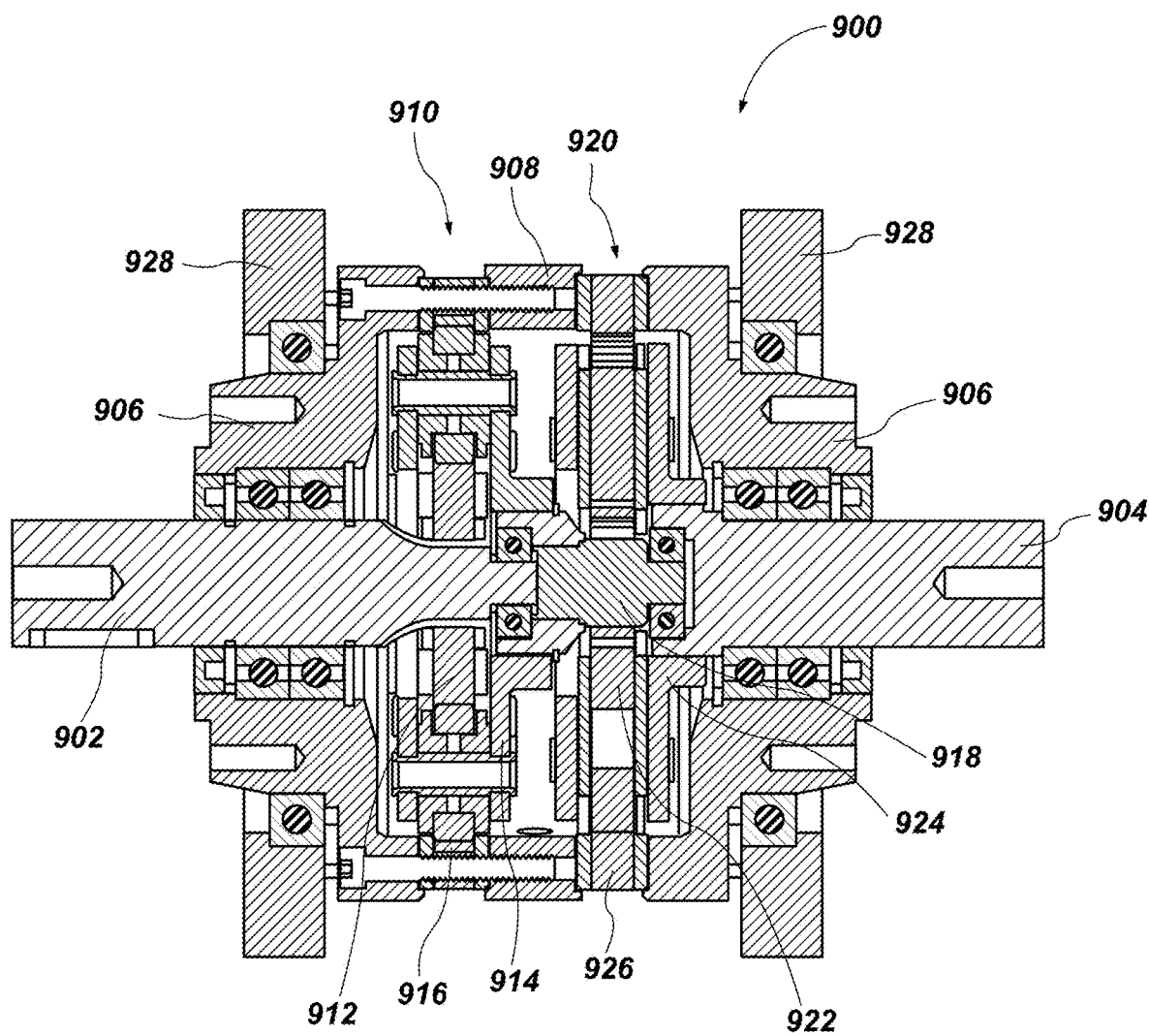

In some embodiments, the housing of the gear drive may be coupled together, such that the housing is configured to rotate as one piece. FIG. 9 illustrates a gear drive 900 including outer ring support structures 906 coupled to ring gears 916, 926 of a respective first planetary gear set 910 and second planetary gear set 920 and the ring gears 916, 926 are coupled together through an intermediate ring support structure 908 to form the outer housing of the gear drive 100.

In the embodiment illustrated in FIG. 9, an input 902 to the gear drive 900 is coupled to a first sun gear 912 of the first planetary gear set 910. The first sun gear 912 is configured to interface with a first carrier 914 and cause the first carrier 914 to rotate when the first sun gear 912 rotates. The first carrier 914 is configured to interface with a first ring gear 916 and cause the first ring gear 916 to rotate. The first ring gear 916 may be configured to rotate in a direction opposite a direction of rotation of the first sun gear 912 and the input 902. The first carrier 914 may also be operatively coupled to a portion of the second planetary gear set 920. As illustrated in FIG. 9, the first carrier 914 is operatively coupled to a second sun gear 922 of the second planetary gear set 920 through an intermediate shaft 918. Thus, the second sun gear 922 is configured to rotate in a same direction and at substantially a same rotational speed as the first carrier 914. As discussed above, the first ring gear 916 and the second ring gear 926 are also operatively coupled, such that the first ring gear 916 and the second ring gear 926 rotate in a same direction and at substantially the same rotational speed. The second ring gear 926 and the second sun gear 922 are configured to interface with a second carrier 924 and cause the second carrier 924 to rotate. The second carrier 924 is coupled to an output 904 and configured to rotate the output 904.

In some embodiments, a second input may be coupled to one of the outer ring support structures 906. The second input may cause the housing, including the ring gears 916, second ring gear 926 to rotate in a same direction and at a same speed as the second input. The housing may rotate relative to mounting structures 928. The interfaces between the first ring gear 916 and the first carrier 914 and between the second ring gear 926 and the second carrier 924 may change a speed and/or torque of the output 904.

In another embodiment, a second output or load may be coupled to one of the outer ring support structures 906. A second output may be rotated by the housing, such that a load on the second output or a load applied to the outer ring support structures 906 may affect a speed of the ring gears 916, 926 by creating resistance to the rotation of the housing including the ring gears 916, 926. The interfaces between the first ring gear 916 and the first carrier 914 and between the second ring gear 926 and the second carrier 924 may change a speed and/or torque of the output 904.

In some embodiments, the output 904 may rotate in a direction opposite a rotating direction of the outer ring support structures 906, as described above. In other embodiments, one or more of the inputs or loads on the gear drive 900 may result in the output 904 and the outer ring support structures 906 rotating in a same direction. For example, in some cases providing an input to the input 902 may result in the output 904 and the outer ring support structures 906 rotating in opposite directions. In another case, operating the gear drive 900 in reverse by applying a rotational input to the output 904 may result in the input 902 and the outer ring support structures 906 rotating in a same direction. In yet another case, a first rotational input may be provided to the input 902 and a second rotational input may be provided to the outer ring support structures 906. If the first rotational input and the second rotational input are in a same rotational direction the output 904 and the outer ring support structures 906 may rotate in the same rotational direction. These same principles may apply to other configurations of a gear drive as described herein.

Figure 10:
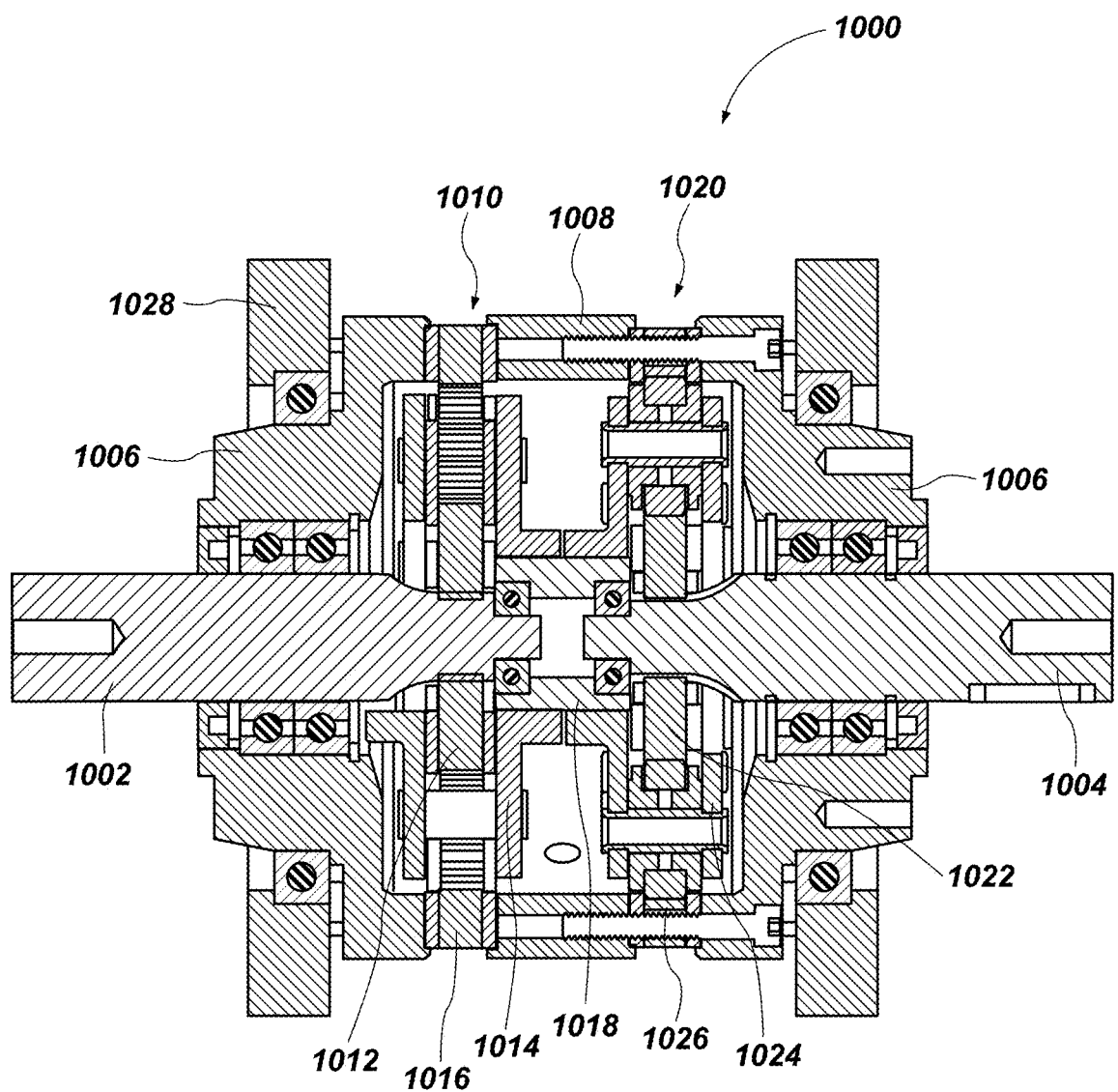

FIG. 10 illustrates another embodiment of a gear drive 1000 including ring support structures 1006, and ring gears 1016, 1026 coupled together through an intermediate ring support structure 1008 to form a housing that rotates as a single unit relative to mounting structures 1028. In the gear drive 1000 illustrated in FIG. 10, an input 1002 is coupled to a first sun gear 1012 of a first planetary gear set 1010. The first sun gear 1012 is configured to rotate a first carrier 1014 through an interface between the first sun gear 1012 and the first carrier 1014. The first carrier 1014 may also interface with a first ring gear 1016 of the first planetary gear set 1010. In some cases, the first carrier 1014 may cause the first ring gear 1016 to rotate relative to the first carrier 1014. In other cases, the first ring gear 1016 may rotate relative to the first carrier 1014 through rotational input received from another component of the housing, such as a second ring gear 1026 of a second planetary gear set 1020 or the ring support structures 1006.

The first carrier 1014 is operatively coupled to a second carrier 1024 of the second planetary gear set 1020 through an intermediate shaft 1018, such that the second carrier 1024 rotates in a same direction and at substantially a same speed as the first carrier 1014. The second carrier 1024 is configured to interface with the second ring gear 1026 and a second sun gear 1022. As discussed above, the second ring gear 1026 is coupled to the first ring gear 1016 through the intermediate ring support structure 1008. The second sun gear 1022 is coupled to an output 1004, such that the output 1004 rotates in a same direction and at a same speed as the second sun gear 1022.

As discussed above, in some embodiments, a second input may be coupled to one of the ring support structures 1006 configured to rotate the ring gears 1016, 1026 in a same direction and at a same speed as the second input. The interfaces between the first ring gear 1016 and the first carrier 1014 and between the second ring gear 1026 and the second carrier 1024 may change a speed and/or torque of the output 1004. In other embodiments, a second output or load may be coupled to one of the outer ring support structures 1006. A load on the second output or a load applied directly to the outer ring support structures 1006 may affect a speed of the ring gears 1016, 1026 by creating resistance to the rotation of the housing including the ring gears 1016, 1026. The interfaces between the first ring gear 1016 and the first carrier 1014 and between the second ring gear 1026 and the second carrier 1024 may change a speed and/or torque of the output 1004.

Figure 11:
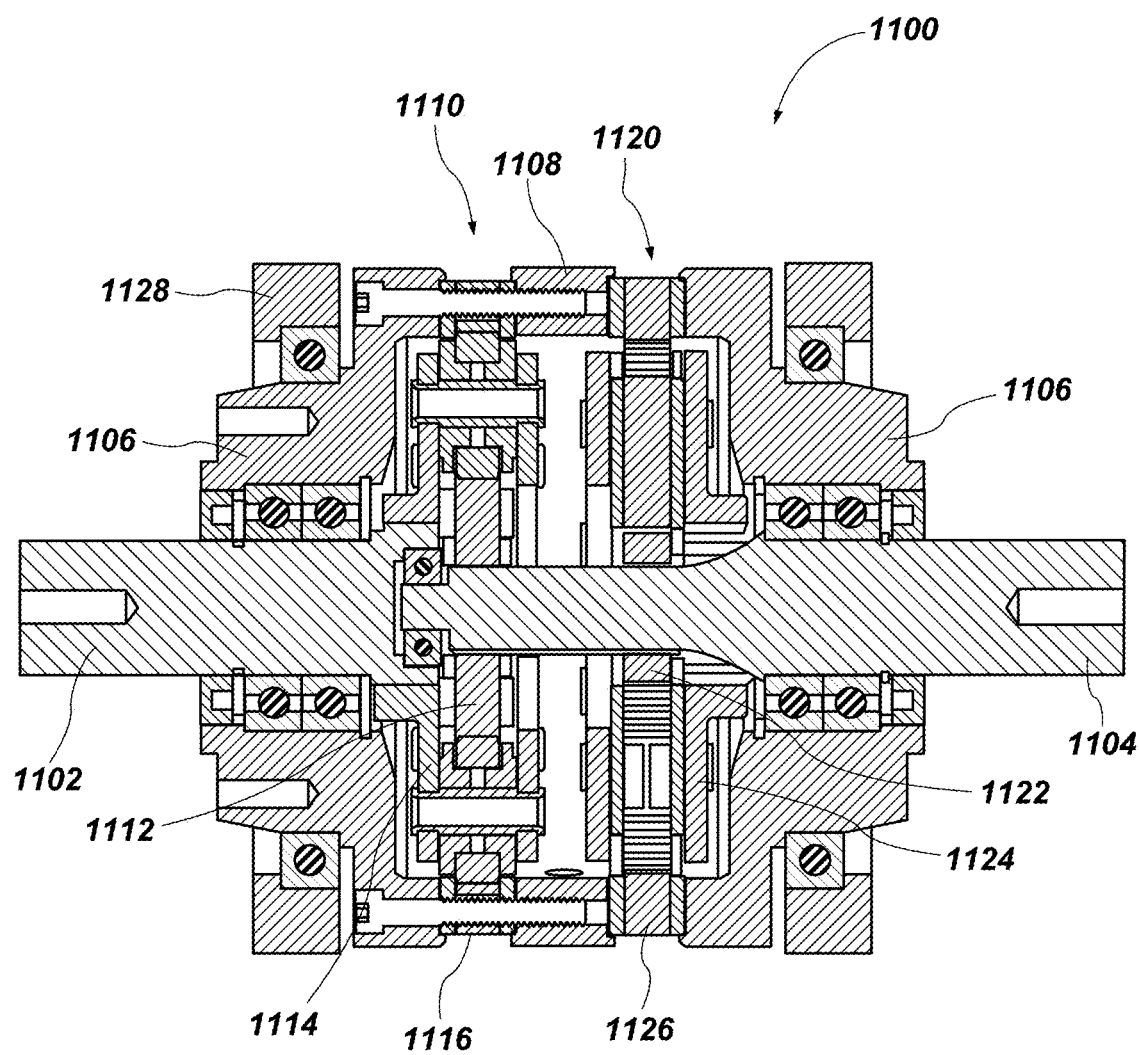

FIG. 11 illustrates another embodiment of a gear drive 1100 including ring support structures 1106, and ring gears 1116, 1126 coupled together through an intermediate ring support structure 1108 to form a housing that rotates as a single unit relative to mounting structures 1128. In the gear drive 1100 illustrated in FIG. 11, an input 1102 is coupled to a first carrier 1114 of a first planetary gear set 1110. The first carrier 1114 interfaces with a first sun gear 1112 and a first ring gear 1116 of the first planetary gear set 1110. As discussed above, the first ring gear 1116 and the 1126 are coupled together through the intermediate ring support structure 1108. The first sun gear 1112 is coupled to an output 1104.

The output 1104 is also coupled to a second sun gear 1122 of a second planetary gear set 1120, such that the first sun gear 1112 and the second sun gear 1122 are configured to rotate in a same direction and at a same speed. The second sun gear 1122 is configured to generate a rotational force on the second ring gear 1126 through an interface between the second sun gear 1122 and a second carrier 1124 and an interface between the second carrier 1124 and the second ring gear 1126. The rotational force on the second ring gear 1126 is transmitted to the first ring gear 1116 through the intermediate ring support structure 1108, such that the rotational force on the ring gears 1116, 1126 may affect a perceived gear ratio of the first planetary gear set 1110.

As discussed above, in some embodiments, a second input may be coupled to one of the ring support structures 1106 configured to rotate the ring gears 1116, 1126 in a same direction and at a same speed as the second input. The interfaces between the first ring gear 1116 and the first carrier 1114 and between the second ring gear 1126 and the second carrier 1124 may change a speed and/or torque of the output 1104. In other embodiments, a second output or load may be coupled to one of the outer ring support structures 1106. A load on the second output or a load applied directly to the outer ring support structures 1106 may affect a speed of the ring gears 1116, 1126 by creating resistance to the rotation of the housing including the ring gears 1116, 1126. The interfaces between the first ring gear 1116 and the first carrier 1114 and between the second ring gear 1126 and the second carrier 1124 may change a speed and/or torque of the output 1104.

Figure 12:
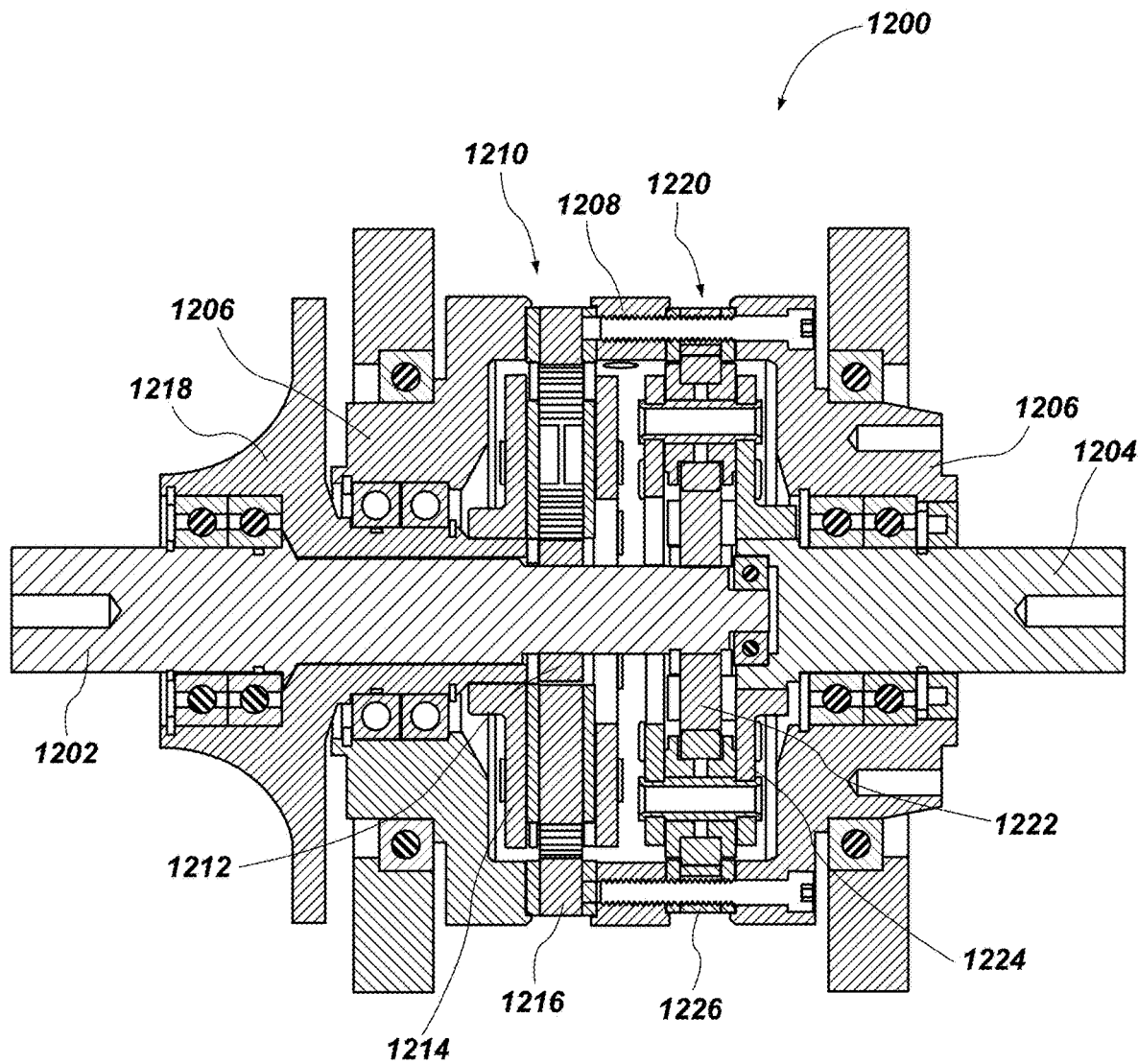

FIG. 12 illustrates another embodiment of a gear drive 1200 including ring support structures 1206, and ring gears 1216, 1226 coupled together through an intermediate ring support structure 1208 to form a housing that rotates as a single unit. In the gear drive 1200 illustrated in FIG. 12, an input 1202 is coupled to a first sun gear 1212 of a first planetary gear set 1210. The input 1202 is also coupled to a second sun gear 1222 of a second planetary gear set 1220. The first sun gear 1212 is configured to transmit rotation to the first ring gear 1216 through an interface between the first sun gear 1212 and a first carrier 1214 and an interface between the first carrier 1214 and the first ring gear 1216. The second sun gear 1222 is configured to transmit rotation to the second ring gear 1226 through an interface between the second sun gear 1222 and a second carrier 1224 and an interface between the second carrier 1224 and the second ring gear 1226. The second carrier 1224 is coupled to an output 1204.

The first sun gear 1212 and the second sun gear 1222 are configured to rotate in a same direction and at a same speed due to each of the first sun gear 1212 and the second sun gear 1222 being coupled to the input 1202. Similarly, the first ring gear 1216 and the second ring gear 1226 are configured to rotate in a same direction and at a same speed, due to the first ring gear 1216 and the second ring gear 1226 being coupled together through the intermediate ring support structure 1208.

The first carrier 1214 is coupled to a control ring 1218. The control ring 1218 may be configured to provide an externally accessible connection point to the first carrier 1214. The control ring 1218 may be coupled to a second input configured to input rotation to the first carrier 1214 affecting a perceived gear ratio of the gear drive 1200. In other embodiments, a load may be applied to the control ring 1218 to resist rotation of the first carrier 1214, such as through friction or an electrical load applied to a generator coupled to the control ring 1218. In some embodiments, the control ring 1218 may be a second output configured to drive another component based on rotation input to the gear drive 1200 through the input 1202.

As discussed above, in some embodiments, a second input may be coupled to one of the ring support structures 1206 configured to rotate the ring gears 1216, 1226 in a same direction and at a same speed as the second input. The interfaces between the first ring gear 1216 and the first carrier 1214 and between the second ring gear 1226 and the second carrier 1224 may change a speed and/or torque of the output 1204. In other embodiments, a second output or load may be coupled to one of the outer ring support structures 1206. A load on the second output or a load applied directly to the outer ring support structures 1206 may affect a speed of the ring gears 1216, 1226 by creating resistance to the rotation of the housing including the ring gears 1216, 1226. The interfaces between the first ring gear 1216 and the first carrier 1214 and between the second ring gear 1226 and the second carrier 1224 may change a speed and/or torque of the output 1204.

Figure 13:
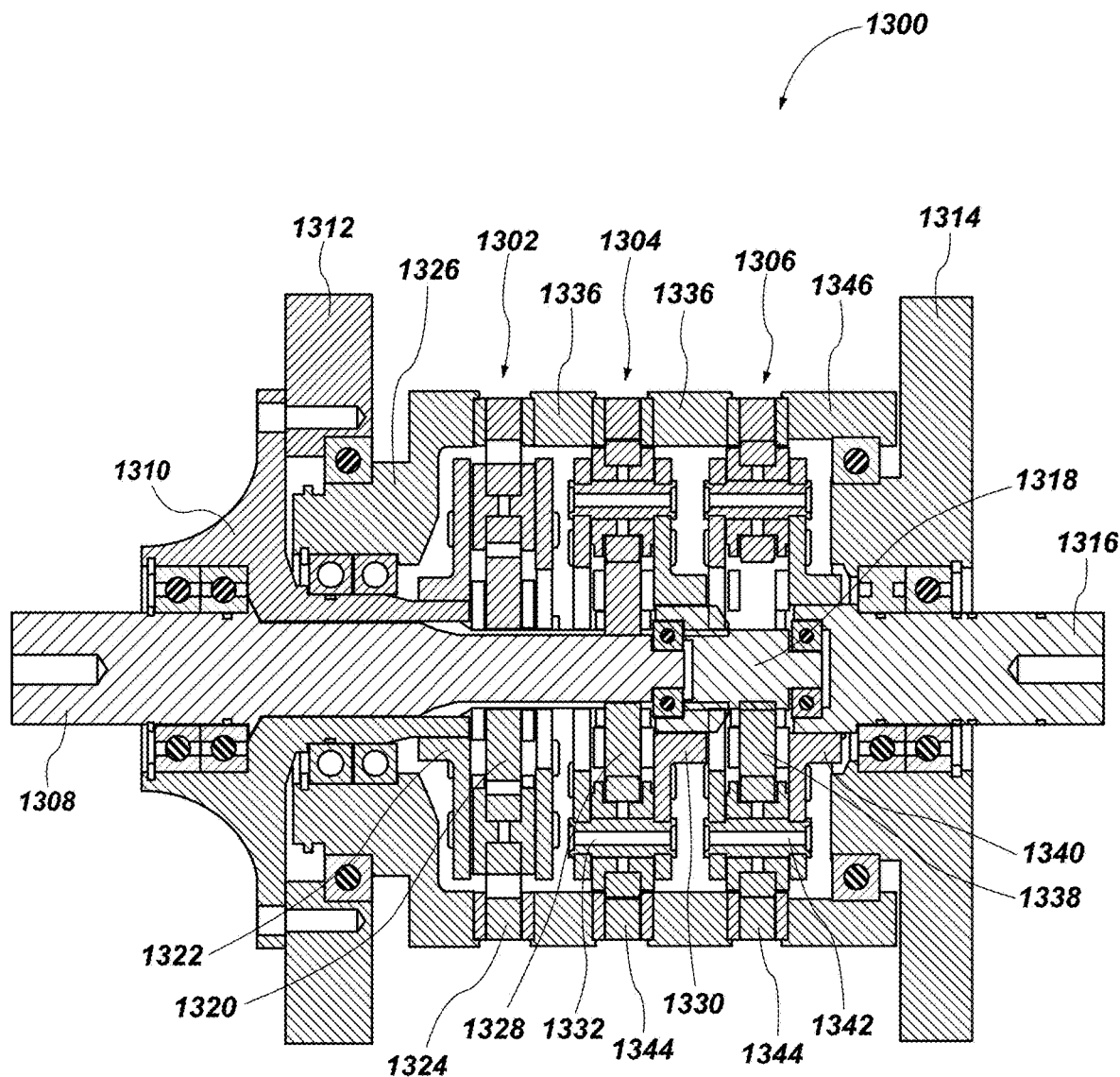

FIG. 13 illustrates another embodiment of a gear drive 1300 including more than two planetary gearsets and configured to drive an output with direct input from two different stacked planetary gear sets. For example, the gear drive 1300 includes three planetary gear sets.

The gear drive 1300 includes an input shaft 1308 on a first axial end of the gear drive 1300 and an output shaft 1316 on a second axial end of the gear drive 1300. The gear drive 1300 may also include mounting structures 1312, 1314 on opposing axial ends of the gear drive 1300. The mounting structures 1312, 1314 may be configured to secure to gear drive 1300 to another structure.

The gear drive 1300 includes a first planetary gear set 1302 proximate the first axial end of the gear drive 1300 and a third planetary gear set 1306 proximate the second axial end of the gear drive 1300 with a second planetary gear set 1304 positioned axially between the first planetary gear set 1302 and the third planetary gear set 1306. A first carrier 1322 of the first planetary gear set 1302 is secured to a control ring 1310, which is secured to the first mounting structure 1312, such that the first carrier 1322 is maintained substantially stationary relative to the rotating components of the gear drive 1300. The input shaft 1308 interfaces with a first sun gear 1320 of the first planetary gear set 1302 and a second sun gear 1328 of the second planetary gear set 1304. The interface between the input shaft 1308 and the first sun gear 1320 causes a first ring gear 1324 of the first planetary gear set 1302 to rotate in a direction opposite the input shaft 1308 through interfaces between the first sun gear 1320, the first ring gear 1324 and first planet gears 1714 of the first carrier 1322. The first ring gear 1324 is secured to a second ring gear 1334 of the second planetary gear set 1304 and a third ring gear 1344 of the third planetary gear set 1306 through intermediate ring support structures 1336. Thus, the first ring gear 1324, the second ring gear 1334, and the third ring gear 1344 each rotate at substantially the same speed and in substantially the same direction. The first ring gear 1324, the second ring gear 1334, and the third ring gear 1344 together with the intermediate ring support structures 1336 form an outer housing of the gear drive 1300. The outer housing may also include a first end ring support structure 1326 and a second end ring support structure 1346 on opposing axial ends of the gear drive 1300 configured to interface with the first mounting structure 1312 and the second mounting structure 1314 on the respective axial ends of the gear drive 1300 through one or more bearings.

The second planetary gear set 1304 may have a gear ratio different from the first planetary gear set 1302. While the second sun gear 1328 and second ring gear 1334 are rotating at substantially the same speed and in the same direction as the first sun gear 1320 and the first ring gear 1324, the different gear ratio of the second planetary gear set 1304 may cause a second carrier 1330 of the second planetary gear set 1304 to rotate relative to the gear drive 1300 due to the interfaces between the second sun gear 1328, the second ring gear 1334, and the second planetary gears 1332 of the second carrier 1330. The second carrier 1330 is coupled to a third sun gear 1338 of the third planetary gear set 1306 through an intermediate shaft 1318, such that the third sun gear 1338 rotates at the same speed and in the same direction as the second carrier 1330.

The rotation of the third sun gear 1338 and the rotation of the third ring gear 1344 combine to cause a third carrier 1340 of the third planetary gear set 1306 to rotate through an interface between third planet gears 1342 of the third carrier 1340 and the third sun gear 1338 and the third ring gear 1344. As indicated above, the third ring gear 1344 is coupled to the first ring gear 1324 of the first planetary gear set 1302 through the intermediate ring support structures 1336 and the third sun gear 1338 is coupled to the second carrier 1330 of the second planetary gear set 1304. Thus, rotation from both the first planetary gear set 1302 and the second planetary gear set 1304 are transmitted directly to components of the third planetary gear set 1306. The third carrier 1340 is coupled to the output shaft 1316, such that the rotation of the output shaft 1316 is driven by the third carrier 1340.

Figure 14:
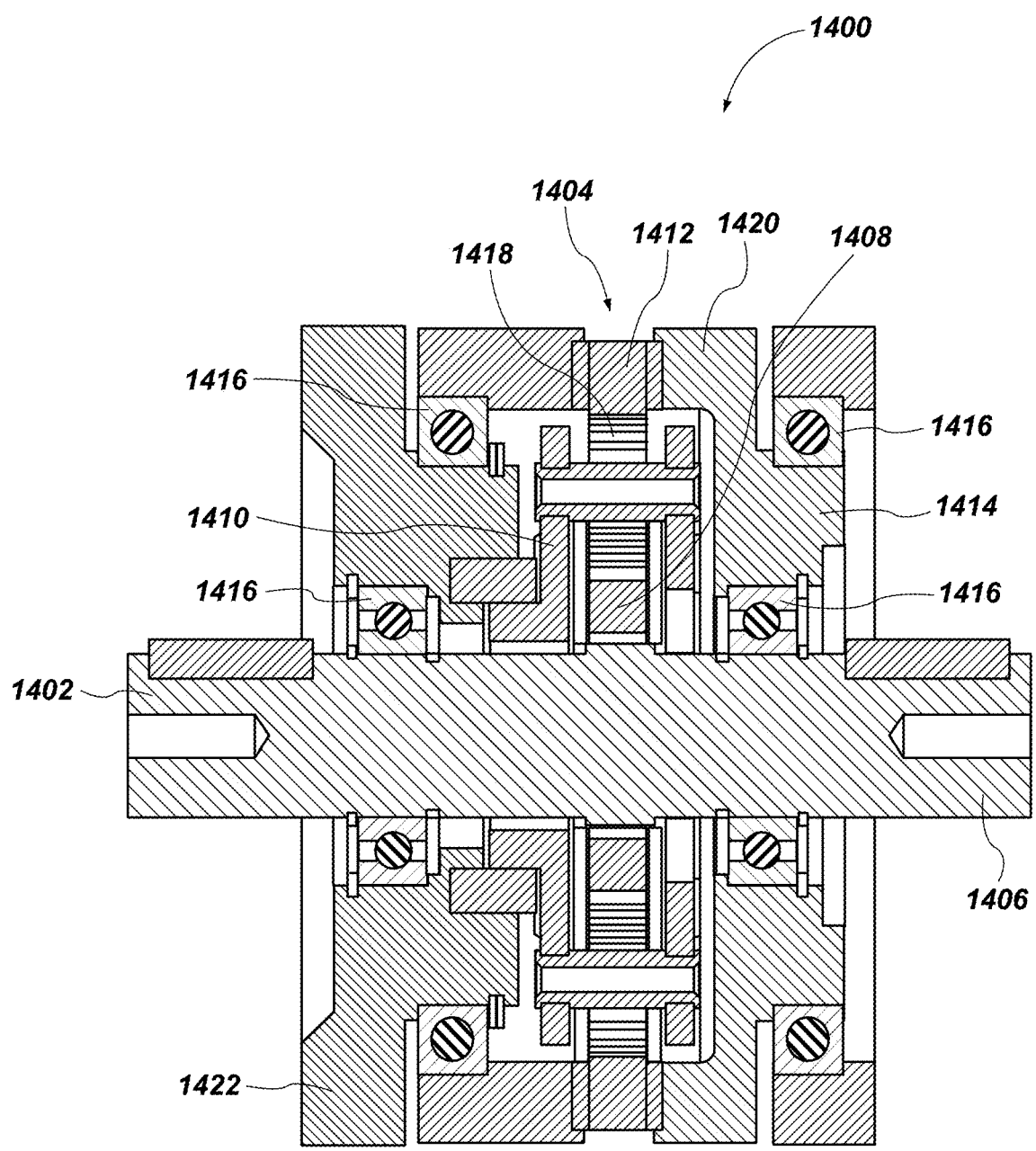

FIG. 14 illustrates another embodiment of a gear drive 1400 configured to convert a single rotational input to two counter-rotating outputs with a single planetary gear set 1404. As illustrated in FIG. 14, the gear drive 1400 includes an input 1402 coupled to a sun gear 1408 of the planetary gear set 1404. The sun gear 1408 is also coupled to a first output 1406. In the embodiment illustrated in FIG. 14, the input 1402 and the first output 1406 are a unitary shaft extending through the gear drive 1400. In other embodiments, the input 1402 and the first output 1406 may be two separate shafts coupled together through another connection, such as a splined connection, a pinned connection, or separate connections to the sun gear 1408. The input 1402 and the first output 1406 are configured to rotate in a same direction (e.g., clockwise or counterclockwise).

Rotation of the sun gear 1408 may cause a ring gear 1412 of the planetary gear set 1404 to rotate in an opposite direction from the sun gear 1408 through interfaces between the sun gear 1408, the ring gear 1412 and planet gears 1418 of a carrier 1410. The carrier 1410 is secured to a mounting structure 1422. In some embodiments, the mounting structure 1422 is secured to a stationary structure, such that the carrier 1410 remains stationary relative to the other rotating components of the gear drive 1400. In other embodiments, the mounting structure 1422 may be coupled to a rotating input, such as a counter-rotating housing from the device driving the input 1402 or a secondary rotating input. The ring gear 1412 is secured to a second output 1414 through a transfer structure 1420. The transfer structure 1420 may be configured to position the second output 1414 radially closer to the first output 1406. As noted above, the ring gear 1412 is configured to rotate in an opposite direction from the sun gear 1408. Thus, the second output 1414 rotates in an opposite direction from the first output 1406, such that the first output 1406 and the second output 1414 are counter-rotating outputs.

The gear drive 1400 also includes multiple bearings 1416 positioned between rotating elements (e.g., the input 1402, the first output 1406, the transfer structure 1420, and the second output 1414) and positioned between stationary components, such as housings, frames, mounting structures, etc., and the rotating elements.

The counter-rotating first output 1406 and second output 1414 may be coupled to any number of devices configured to receive counter-rotating inputs, such as a generator, dual propellers, dual turbines, etc.

In some embodiments, the gear drive 1400 may be operated in reverse with a rotational input being provided to the first output 1406 and rotational outputs provided through the first input 1402, the mounting structure 1422, and the second output 1414 or the transfer structure 1420 (e.g., housing).

Figure 15:
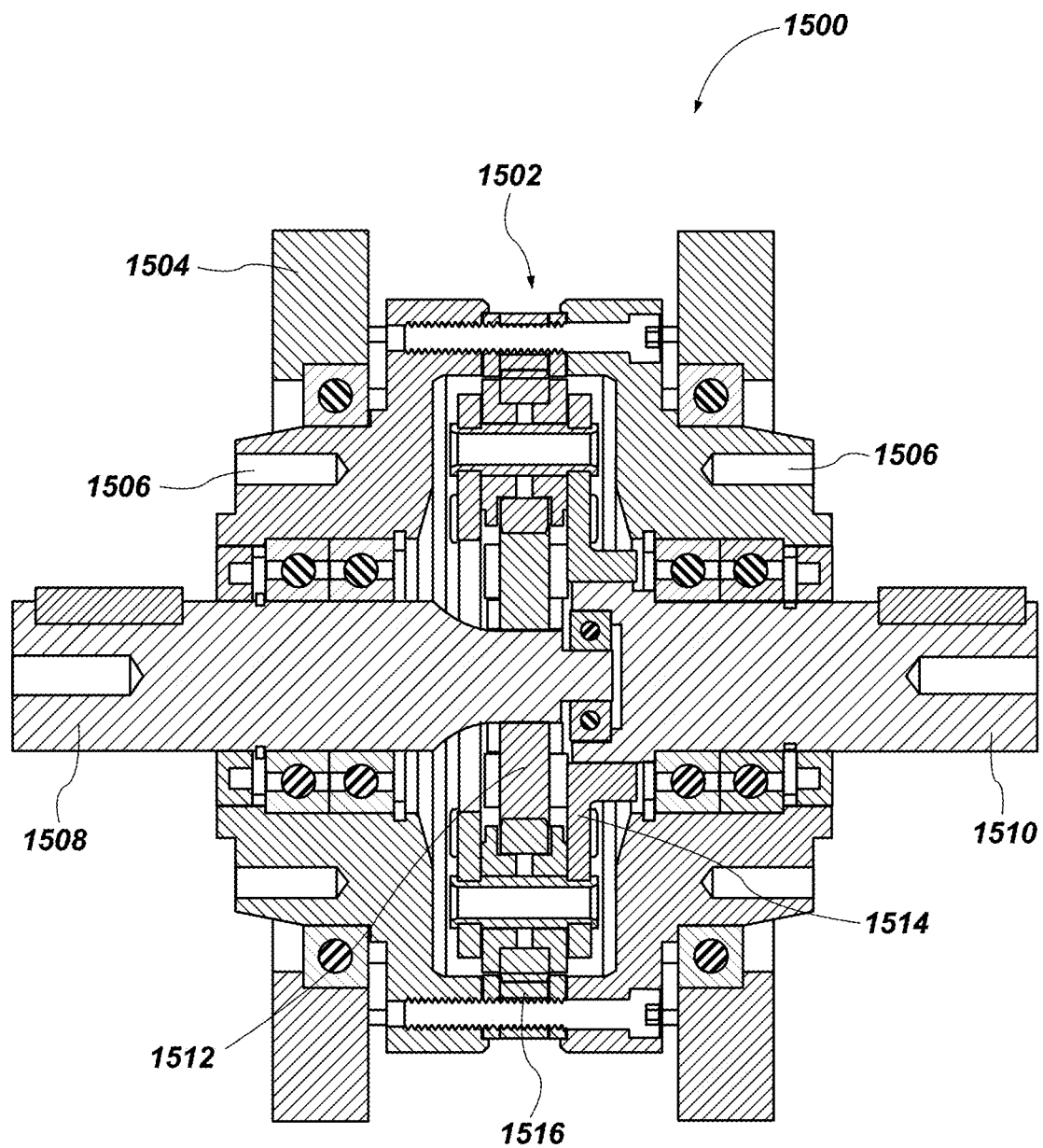

FIG. 15 illustrates another embodiment of a gear drive 1500 using a single planetary gear set 1502. As illustrated in FIG. 15, the gear drive 1500 includes an input 1508 coupled to a sun gear 1512 of the planetary gear set 1502. The sun gear 1512 is configured to interface with a carrier 1514. The carrier 1514 is coupled to an output 1510. The carrier 1514 is also configured to interface with a ring gear 1516. The ring gear 1516 is secured to ring support structures 1506 to form a housing for the gear drive 1500. The housing including the ring gear 1516 and the ring support structures 1506 is configured to rotate relative to mounting structures 1504, such that each of the ring gear 1516, the carrier 1514, and the sun gear 1512 rotate relative to the mounting structure 1504.

In some embodiments, the ring support structure 1506 is configured to be coupled to a second output. For example, as discussed above, the ring gear 1516 may be configured to rotate in an opposite direction from the carrier 1514, such that the output 1510 and the ring support structures 1506 may rotate in opposite directions. Thus, the second output may be configured to rotate in a direction opposite a rotational direction of the output 1510.

In other embodiments, the ring support structure 1506 is configured to be coupled to a controlled load, such as a generator or a brake configured to controllably restrict rotation of the ring support structure 1506. Controlling the rotation of the ring support structure 1506 may change a perceived gear ratio of the gear drive 1500. In other embodiments, a second input may be coupled to the ring support structure 1506, such that rotation input into the ring gear 1516 through the ring support structure 1506 may affect a perceived gear ratio of the gear drive 1500.

Some embodiments of gear drives having more than one planetary gear set may be configured to vary the force multiplication or speed multiplication factors of the gear drive by back-feeding rotation from a secondary planetary gearset into a primary planetary gear set. The resulting force or speed multiplication factors between the input and the output may be dependent on a rotational speed of the input.

Figure 16:
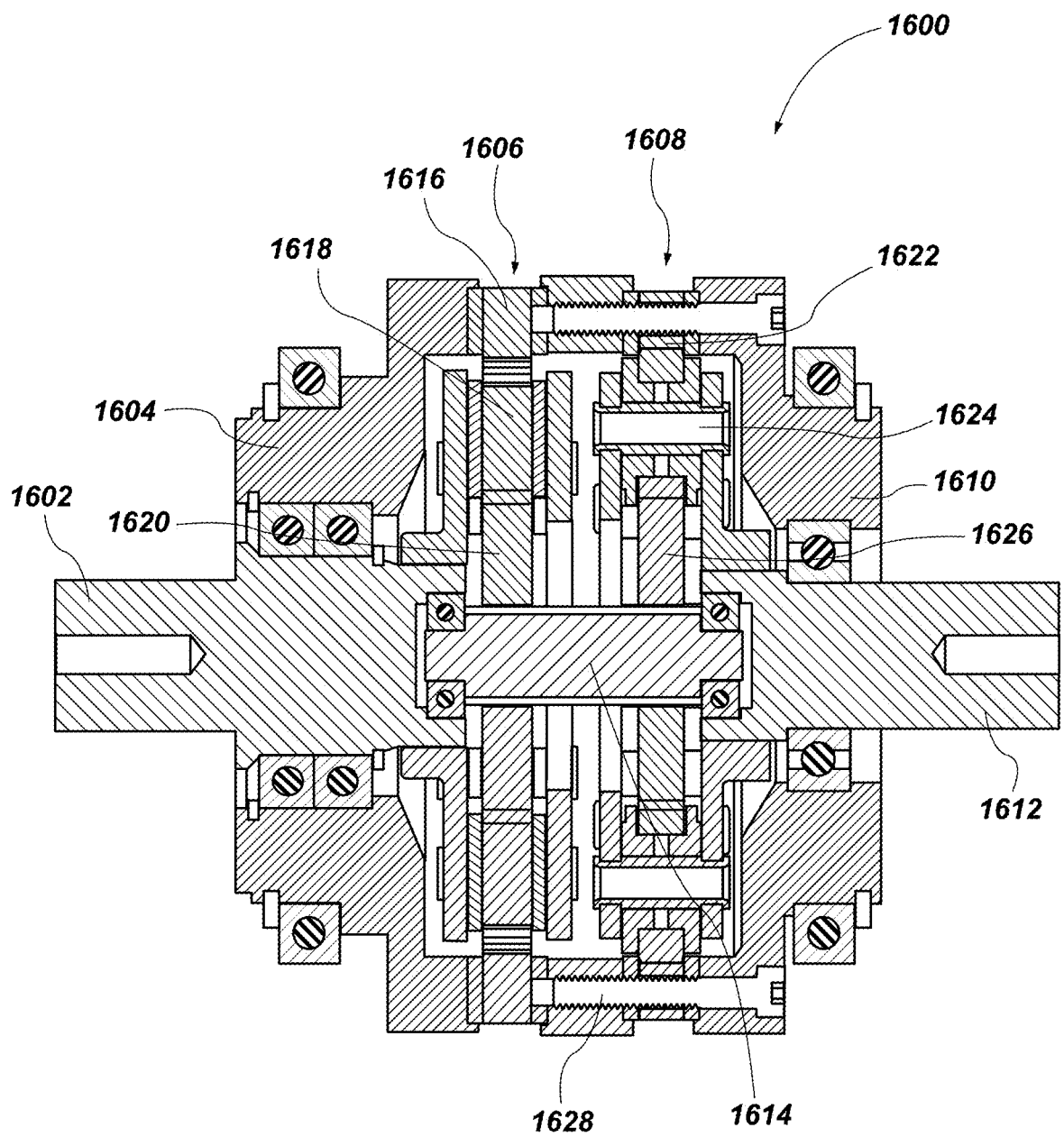

FIG. 16 illustrates another embodiment of a gear drive 1600. The gear drive 1600 includes an input 1602 and an output 1612. The input 1602 is coupled to a first carrier 1618 of a first planetary gear set 1606 and the output 1612 is coupled to a second carrier 1624 of a second planetary gear set 1608. A first ring gear 1616 of the first planetary gear set 1606 is coupled to a second ring gear 1622 of the second planetary gear set 1608. For example, the first ring gear 1616 may be coupled to the second ring gear 1622 through a linking structure 1628, which may include a hardware connection or series of hardware connections, such as bolts, screws, pins, etc. Extending through each of the first ring gear 1616 and the second ring gear 1622 or through an input housing 1604 and/or an output housing 1610 coupled to the respective first ring gear 1616 and the second ring gear 1622.

As the input 1602 rotates the first carrier 1618, an interface between planet gears of the first carrier 1618 causes the first ring gear 1616 to rotate. The first ring gear 1616 causes the second ring gear 1622 to rotate through the connection between the first ring gear 1616 and the second ring gear 1622. The second ring gear 1622 of the second planetary gear set 1608 then causes the second carrier 1624 to rotate through an interface between planet gears of the second carrier 1624 and the second ring gear 1622. The second carrier 1624 may then turn the output 1612 through the connection between the output 1612 and the second carrier 1624. In some embodiments, the output housing 1610 is coupled to a second output configured to rotate in a direction opposite the rotating direction of the output 1612 as described in the embodiments above.

A first sun gear 1620 of the first planetary gear set 1606 is rotatably coupled to a second sun gear 1626 of the second planetary gear set 1608 through a linking shaft 1614. In some embodiments, the linking shaft 1614 includes teeth or splines configured to interface with complementary teeth or splines in the respective first sun gear 1620 and second sun gear 1626. In another embodiment, the first sun gear 1620 and the second sun gear 1626 are formed as part of the linking shaft 1614, such that the first sun gear 1620, the linking shaft 1614, and the second sun gear 1626 are a unitary part. In other embodiments, the second sun gear 1626 and the first sun gear 1620 may be coupled to the linking shaft 1614 through other elements, such as couplers, keyways, interference fits, hardware connections, etc.

A gear ratio of the second planetary gear set 1608 may be different from a gear ratio of the first planetary gear set 1606. For example, the sun to ring gear ratio of the first planetary gear set 1606 may be 5:1 and the sun to ring gear ratio of the second planetary gear set 1608 may be 3:1. In another embodiments, the sun to ring gear ratio of the first planetary gear set 1606 may be 3:1 and the sun to ring gear ratio of the second planetary gear set 1608 may be 5:1. As discussed above, the input 1602 causes the first ring gear 1616 to rotate through the interface between the planet gears of the first carrier 1618 and the first ring gear 1616. The first ring gear 1616 then causes the second ring gear 1622 to rotate through the connection between the first ring gear 1616 and the second ring gear 1622. The second ring gear 1622 causes the second carrier 1624 to rotate through the interface between the planet gears of the second carrier 1624 and the second ring gear 1622. The planet gears of the second carrier 1624 may also cause the second sun gear 1626 to rotate through an interface between the planet gears of the second carrier 1624 and the second sun gear 1626. The second sun gear 1626 may then cause the first sun gear 1620 to rotate through the linking shaft 1614. The rotation of the first sun gear 1620 may increase a speed of rotation of the planet gears of the first carrier 1618 through an interface between the first sun gear 1620 and the planet gears of the first carrier 1618. The speed of rotation of the first ring gear 1616 may in turn be increased through the interface between the planet gears of the first carrier 1618 and the first ring gear 1616. Thus, the interface between the second sun gear 1626 and the first sun gear 1620 through the linking shaft 1614 may alter a total perceived gear ratio (e.g., the force or speed multiplication factors) of the gear drive 1600. Furthermore, a degree of the alteration to the total perceived gear ratio may change as a rotational speed of the second sun gear 1626 and the first sun gear 1620 change. Thus, a final perceived gear ratio of the gear drive 1600 may be defined by a speed and torque of the input 1602.

Gear ratios of the first planetary gear set 1606 and the second planetary gear set 1608 may define a speed with which the gear drive 1600 responds to changes in the speed and/or torque of the input 1602. For example, as the first sun gear 1620 is driven by the second sun gear 1626, the first sun gear 1620 will increase a speed of the first ring gear 1616 through the planet gears of the first carrier 1618, thereby altering a final perceived gear ratio of the gear drive 1600.

Figure 17:
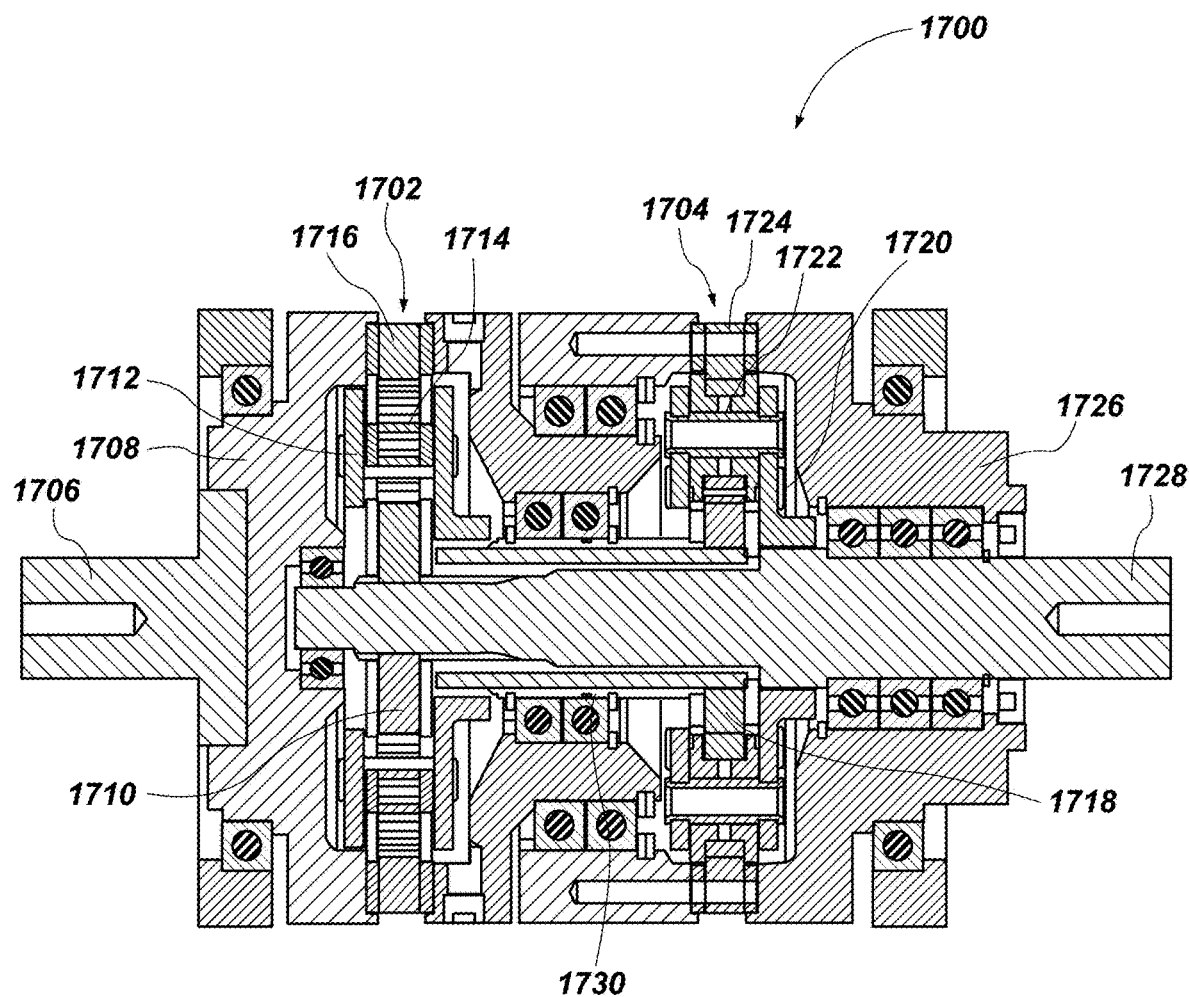

FIG. 17 illustrates another embodiment of a gear drive 1700 configured to back-feed rotation from a second planetary gear set 1704 to a first planetary gear set 1702. In the gear drive 1700 an input 1706 is coupled to a first ring gear 1716 of the first planetary gear set 1702 through an input structure 1708. The first planetary gear set 1702 is configured to impart rotation on a first sun gear 1710 through an interface between the first ring gear 1716, the first sun gear 1710 and first planet gears 1714 of a first carrier 1712. The first sun gear 1710 is secured to a first output shaft 1728, such as through a splined connection, an interference connection, a hardware connection, etc. The first output shaft 1728 is also coupled to a second carrier 1720 of the second planetary gear set 1704 through another splined connection, interference connection, hardware connection, etc. Thus, the first sun gear 1710 of the first planetary gear set 1702 is coupled to the second carrier 1720 of the second planetary gear set 1704 through the first output shaft 1728.

The second carrier 1720 is configured to impart rotation on both a second ring 1724 of the second planetary gear set 1704 and a second sun gear 1718 of the second planetary gear set 1704 through second planet gears 1722 of the second carrier 1720. The second ring 1724 is coupled to a second output structure 1726, which is configured to rotate in an opposite direction from the first output shaft 1728, such that the second output structure 1726 and the first output shaft 1728 are counter-rotating outputs. The second sun gear 1718 is coupled to the first carrier 1712 through an intermediate shaft 1730, such that the second sun gear 1718 is configured to back-feed rotation to the first carrier 1712 to change a rotation speed of the first output shaft 1728 at different rotational speeds of the input 1706 and first ring gear 1716.

The configuration illustrated in gear drive 1700 may be configured to limit an output rotational speed of the first output shaft 1728 and the second output structure 1726. The gear ratios of the first planetary gear set 1702 and the second planetary gear set 1704 may be selected to limit an output rotational speed of the first output shaft 1728 and the second output structure 1726 to a desired rotational speed.

Figure 18:
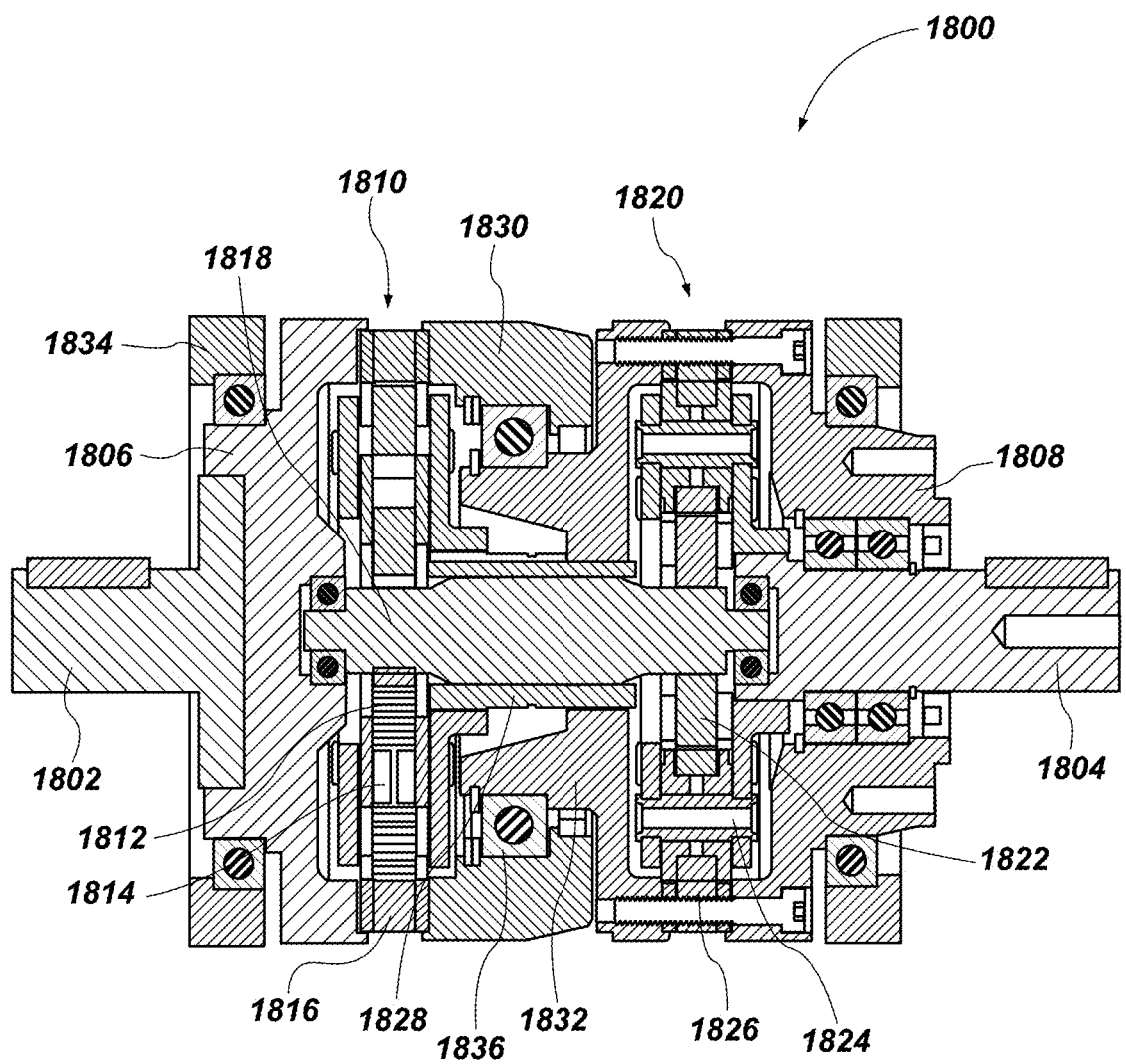

FIG. 18 illustrates another embodiment of a gear drive 1800 configured to back-feed rotation from a second planetary gear set 1820 to a first planetary gear set 1810 while having a split housing. In the gear drive 1800 illustrated in FIG. 18, an input 1802 is coupled to a first ring gear 1816 of the first planetary gear set 1810 through a ring input structure 1806. The first ring gear 1816 is configured to rotate relative to a second ring gear 1826 of the second planetary gear set 1820. The first ring gear 1816 and the second ring gear 1826 may be rotationally isolated from one another through a bearing 1836 positioned between an outer ring support structure 1830 of the first ring gear 1816 and an inner ring support structure 1832 of the second ring gear 1826. Each of the first ring gear 1816 and the second ring gear 1826 along with the associated support structures 1806, 1830, 1832, 1808 may be configured to rotate relative to mounting structures 1834 of the gear drive 1800. The first ring gear 1816 is configured to transmit rotation to a first carrier 1814 through an interface between the first ring gear 1816 and the first carrier 1814. The first ring gear 1816 is also configured to transmit rotation to a first sun gear 1812 through the interface between the first ring gear 1816 and the first carrier 1814 and an interface between the first carrier 1814 and the first sun gear 1812.

The first sun gear 1812 is coupled to a second sun gear 1822 of the second planetary gear set 1820 through a first intermediate shaft 1818, such that the first sun gear 1812 and the second sun gear 1822 are configured to rotate in a same direction and at a same speed. The first carrier 1814 is also coupled to the second ring gear 1826 through a second intermediate shaft 1828, substantially surrounding the first intermediate shaft 1818. Thus, the first carrier 1814 and the second ring gear 1826 are configured to rotate in a same direction and at a same speed. The second sun gear 1822 and the second ring gear 1826 are communicatively coupled through a second carrier 1824. The second carrier 1824 is also coupled to an output 1804 of the gear drive 1800. Changes in a rotational speed or torque of one of the second sun gear 1822 or the second ring gear 1826 may alter a perceived gear ratio of the gear drive 1800 between the input 1802 and the output 1804.

In some embodiments, an additional load or output is applied to the ring output structure 1808. The additional load or output may be configured to resist movement of the second ring gear 1826, which may alter a rotational speed of the second ring gear 1826 and the first carrier 1814. The changed rotational speed of the first carrier 1814 and the second ring gear 1826 may then alter a perceived gear ratio of the gear drive 1800, such that changing a resistance to the movement of the ring output structure 1808 may facilitate dynamically changing a perceived gear ratio of the gear drive 1800.

In some embodiments, additional planetary gear sets may be stacked on a gear drive, such as one or more of the gear drives 100, 600, 700, 800, 900, 1000, 1100, 1200, 1300, 1400, 1500, 1600, 1700, 1800, described above. The additional planetary gear sets may be configured to create a lower gear (e.g., increase a mechanical advantage or force multiplication factor of the gear drive). In other embodiments, the additional planetary gear sets may be configured to create a higher gear (e.g., increase a speed multiplication factor of the gear drive).

Figure 19:
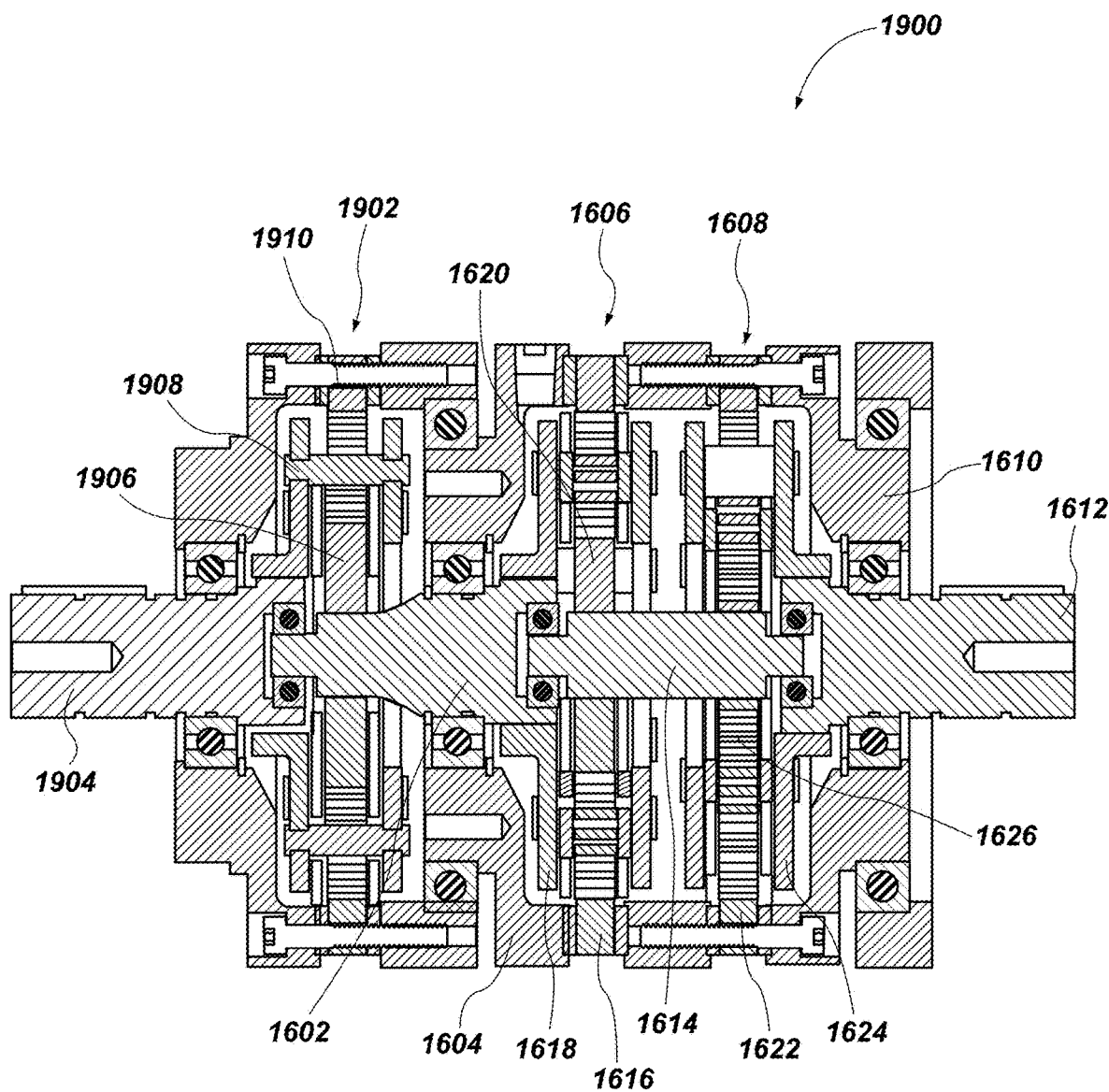

FIG. 19 illustrates a gear drive 1900 including a primary planetary gear set 1902 applied to the gear drive 1600 illustrated and described in FIG. 16. A primary input 1904 is coupled to a primary carrier 1908 of the primary planetary gear set 1902. A primary ring gear 1910 of the primary planetary gear set 1902 is fixed to an outer mounting structure of the primary planetary gear set 1902. In some embodiments, the outer mounting structure is held stationary, such that the primary ring gear 1910 is also held stationary. The primary input 1904 may cause the primary carrier 1908 to rotate. The rotation of the primary carrier 1908 is then transmitted to a primary sun gear 1906 of the primary planetary gear set 1902. The primary sun gear 1906 is coupled to the input 1602 of the gear drive 1600. While, FIG. 19 illustrates the primary planetary gear set 1902 coupled to the input 1602 of gear drive 1600, the primary planetary gear set 1902 may similarly be coupled to the input of other gear drives, such as gear drives 100, 600, 700, 800, 900, 1000, 1100, 1200, 1300, 1400, 1500, 1600, 1700, 1800, described above.

In some embodiments, additional components may be coupled to a gear drive, such as one or more of the gear drives 100, 600, 700, 800, 900, 1000, 1100, 1200, 1300, 1400, 1500, 1600, 1700, 1800, 1900. For example, the counter-rotating outputs of a gear drive may be coupled to two different components, such that a first input drives a first component and a second output drives a separate second component. In some embodiments, the two components may be related, such as the rotor and stator of a generator, counter-rotating propellers, etc. In other embodiments, the two components may not be related. For example, a first output may be configured to drive one or more wheels of a vehicle and the second output may be configured to rotate a rotor of a generator.

Figure 20:
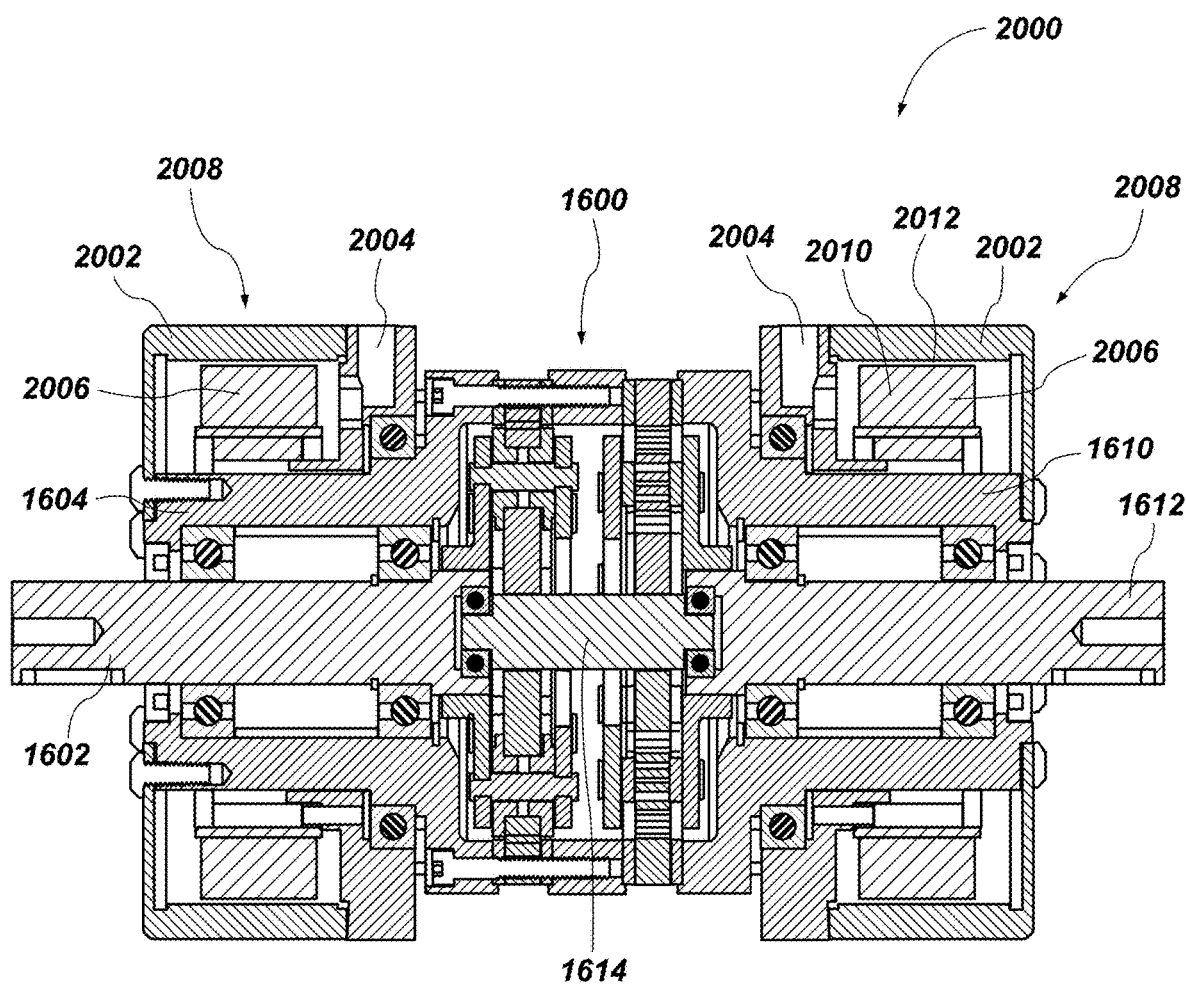

FIG. 20 illustrates a gear drive system 2000 including a gear drive 1600 with a rotor 2002 of a generator 2008 coupled to the output housing 1610. The output 1612 extends from the gear drive system 2000 to be coupled to an external component, such as a drive shaft, differential, wheel hub, pump, propeller, etc. The generator 2008 includes a stator 2006 coupled to a mounting structure 2004, such that the stator 2006 is configured to remain stationary relative to the rotor 2002. The rotor 2002 and the stator 2006 may include windings and magnets configured to induce a changing electrical field around the windings to induce an electric current in the windings. In the embodiment illustrated in FIG. 20, the rotor 2002 includes multiple permanent magnets 2012 arranged circumferentially about an inner surface of the rotor 2002 facing the stator 2006. The stator 2006 includes windings 2010 extending radially therefrom toward the inner surface of the rotor 2002. Thus, rotating the rotor 2002 relative to the stator 2006 causes a changing electrical field about the windings 2010 generating a current in the windings 2010.

The generator 2008 may be configured to feed an electrical load, such as charging a battery, driving an electric motor, creating heat in a resistor bank, etc. Changes in the electrical load may change a resistance to the rotation of the output housing 1610 coupled to the rotor 2002 of the generator 2008. Thus, the electric load on the generator 2008 may be used to control rotation of the output housing 1610 of the gear drive 1600. As discussed above, the gear drives may be configured to balance output forces or speeds between the output housing 1610 and the output 1612 through back-feeding features, such as the linking shaft 1614. Thus, by controlling the rotation of the output housing 1610, the generator 2008 may also control the output 1612.

In some embodiments, the input housing 1604 of the gear drive 1600 is also configured to rotate. A generator 2008 may also be coupled to the input housing 1604, as illustrated in FIG. 20. The generator 2008 may be coupled to the input housing 1604 in a similar manner to the generator 2008 coupled to the output housing 1610. For example, the rotor 2002 of the generator 2008 may be coupled to the input housing 1604 and configured to rotate with the input housing 1604. The stator 2006 may similarly be coupled to the mounting structure 2004, such that the stator 2006 is maintained in a stationary position relative to the rotor 2002. Similar to the generator 2008 coupled to the output housing 1610, the generator 2008 coupled to the input housing 1604 may be configured to control the rotation of the input housing 1604, such that the generator 2008 may be configured to change rotational characteristics of the gear drive 1600 through changes in an electrical load on the generator 2008.

Figure 21:
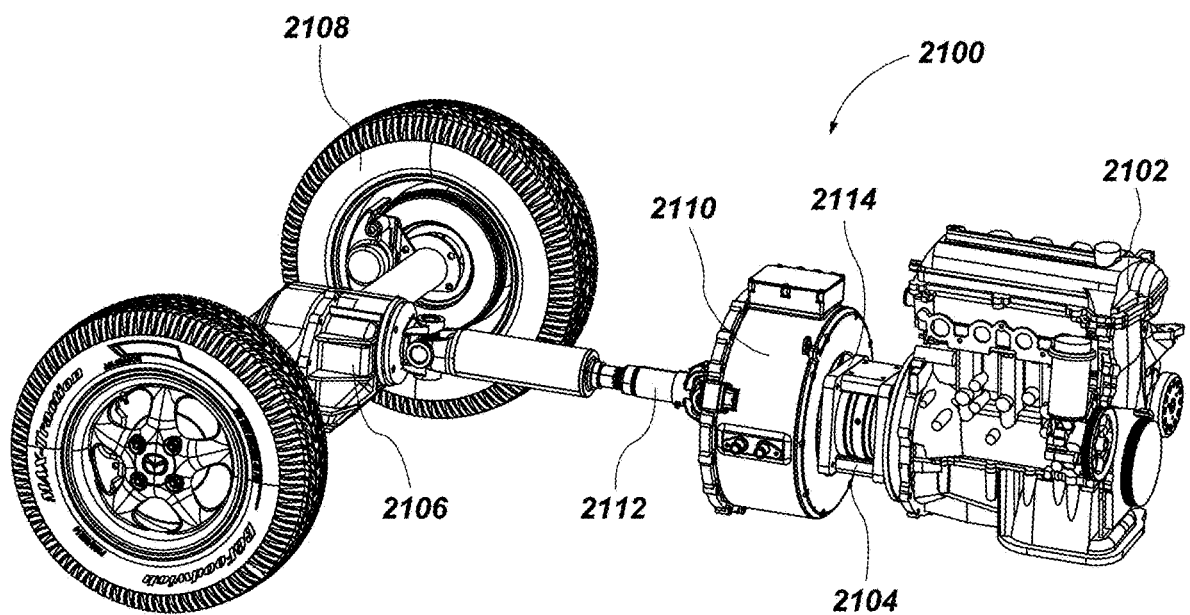
FIGS. 21 and 22 illustrate schematic drawings of a system including a gear drive in accordance with embodiments of the disclosure.

FIG. 21 illustrates a drive system 2100 including a gear drive 2104, such as gear drives 100, 600, 700, 800, 900, 1000, 1100, 1200, 1300, 1400, 1500, 1600, 1700, 1800, 1900, or 2000. The drive system 2100 includes a motor 2102 operatively coupled to the gear drive 2104. The motor 2102 may include a device configured to provide a rotational input to the gear drive 2104, such as an internal combustion engine (e.g., gasoline engine, diesel engine, etc.), an electric motor, or a combination of one or more motors (e.g., a hybrid system).

As discussed above, the gear drive 2104 includes two counter-rotating outputs 2112 and 2114. A first output 2112 is coupled to a hub 2106. The hub 2106 may be configured to convert the rotation of the first output 2112 to usable rotation. For example, FIG. 21 illustrates a wheel 2108 operatively coupled to the hub 2106, such that the hub 2106 is configured to transfer the rotation of the first output 2112 to the wheel 2108. The second output 2114 is operatively coupled to a control connection 2110. The control connection 2110 may be used to control the first output 2112 by changing a resistance to movement of the second output 2114. The control connection 2110 may include a rotor coupled to the second output 2114 and a stator coupled to a stationary element, such as a frame. For example, as discussed above, with respect to the gear drive system 2000 (FIG. 20), a generator 2008 may be used to control the first output 2112 by varying rotational resistance through an electrical load on the control connection 2110 to induce a load on the rotor. In other embodiments, the control connection 2110 may be a secondary drive system, a regeneration motor, a brake, torque converter, etc.

Figure 22:
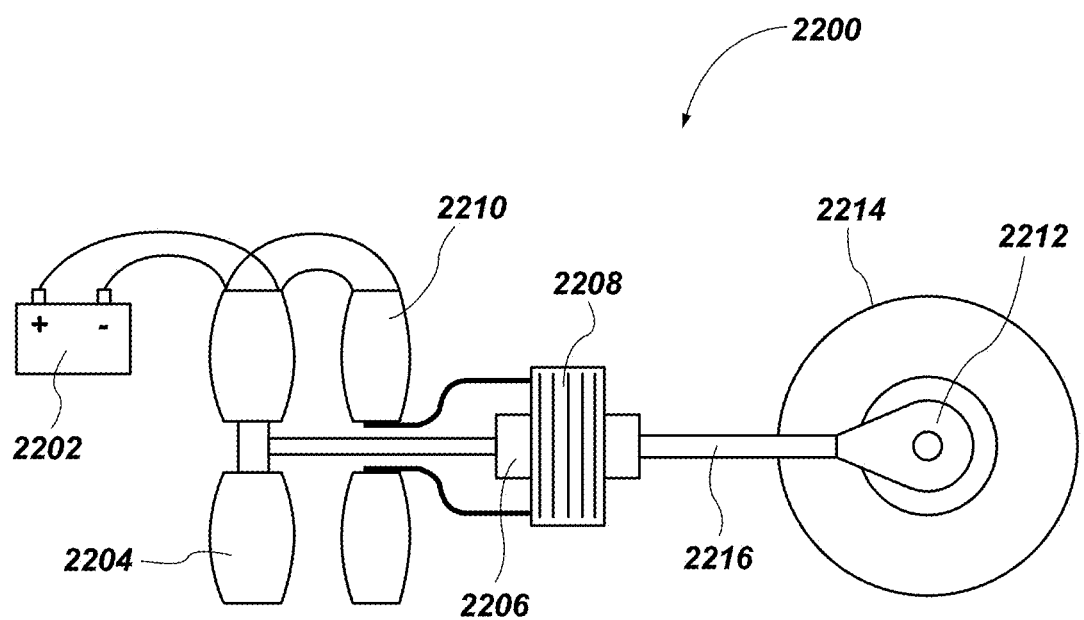

FIG. 22 illustrates an embodiment of an electric drive system 2200 including a gear drive 2206, such as gear drives 100, 600, 700, 800, 900, 1000, 1100, 1200, 1300, 1400, 1500, 1600, 1700, 1800, 1900, or 2000. The electric drive system 2200 includes a power source 2202, such as a battery, a generator, or a fuel cell. The power source 2202 provides electrical power to one or more drive motors 2204. The drive motors 2204 convert the electrical power into rotation. The rotation is input into the gear drive 2206. The rotation from the drive motors 2204 is transferred through the gear drive 2206, with the gear drive 2206 increasing or decreasing a torque of the output and a speed of the output as described above, through the planetary gear sets and different intermediate connections within the gear drive 2206. An output shaft 2216 is configured to transmit the rotation from the gear drive 2206 to a hub 2212. The hub 2212 may be configured to convert the rotation of the first output shaft 2216 to usable rotation. For example, FIG. 22 illustrates a wheel 2214 operatively coupled to the hub 2212, such that the hub 2212 is configured to transfer the rotation of the output shaft 2216 to the wheel 2214.

A generator 2210 is coupled to a second output 2208 of the gear drive 2206 as discussed above, with respect to FIGS. 17 and 18. The generator 2210 may be configured to control the output of the output shaft 2216 by changing a resistance to movement of the second output 2208. As discussed above, the generator 2210 may change the resistance by changing an electric load on the generator 2210. For example, the generator 2210 may be one or more regeneration motors operatively coupled to the second output 2208. The one or more regeneration motors may be configured to provide a charge back to the power source 2202 by transferring the electricity generated by the generator 2210 (regeneration motors) back to the power source 2202. The generator 2210 may be configured to alter the amount of power provided back to the power source 2202 to control the restriction of the second output 2208. For example, the amount of power provided back to the power source 2202 may be reduced to reduce restriction of the rotation of the second output 2208 and the amount of power provided back to the power source 2202 may be increased to increase restriction of the rotation of the second output 2208. As discussed above, changing the restriction on the second output 2208 may alter a perceived gear ratio between the input and the output shaft 2216 of the gear drive 2206.

Figure 23:
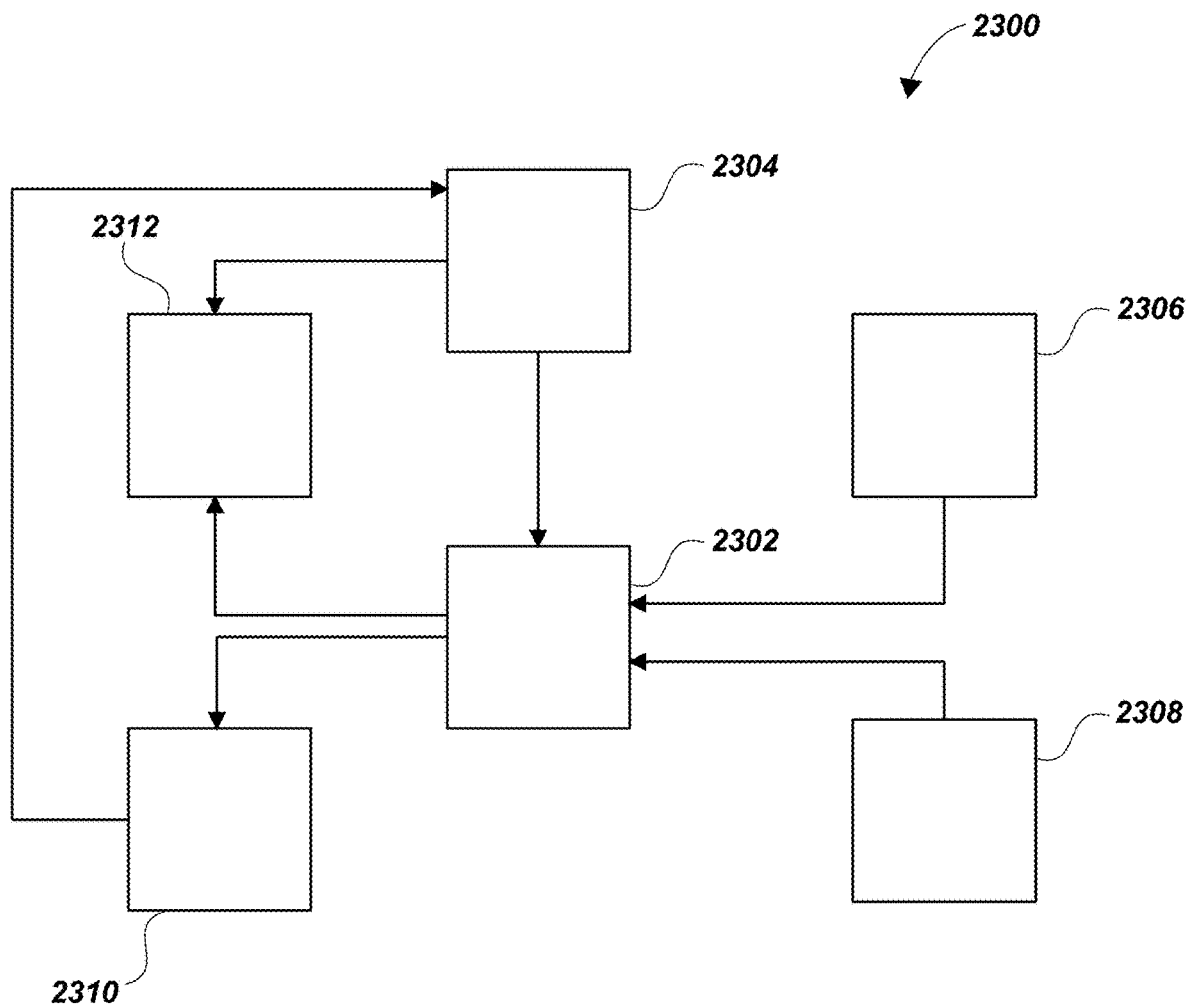
FIG. 23 illustrates a schematic drawing of a control system in accordance with embodiments of the disclosure.

FIG. 23 illustrates a schematic representation of a control system 2300 for an electric drive system, such as the electric drive system 2200. The control system 2300 includes a controller 2302 configured to receive input data from user inputs 2306 and sensor inputs 2308 and to output control signals to drive motors 2312 and regeneration motors 2310. The controller 2302 may include a processor, memory, and/or a non-transitory computer readable medium. At least one of the memory or non-transitory computer readable medium may include instructions that cause the processor of the controller 2302 to interpret the inputs and control the outputs from the controller 2302.

The user inputs 2306 may include control signals, such as acceleration or deceleration signals (e.g., throttle and brake inputs in a vehicle). Other user inputs 2306 may include changes to settings, such as response speeds, which may alter the speed of changes to control signals to the regeneration motors 2310, which may change the control system 2300 response speed to changes in inputs, such as acceleration or deceleration.

The sensor inputs 2308 may provide information regarding the operation of the control system 2300. For example, the sensor inputs 2308 may include data from sensors, such as accelerometers, gyrometers, temperature sensors, pressure sensors, current sensors, position sensors, switches, etc. The controller 2302 may evaluate the sensor inputs 2308 to determine when to make control changes to the outputs. In some embodiments, the controller 2302 can determine if the control system 2300 is operating correctly based on a comparison of sensor inputs 2308 and output signals. If the control system 2300 is not operating correctly, the controller 2302 may correct operations through changes to outputs and/or transmit an error message or alert to a user.

The controller 2302 may control a speed of the drive motor 2312 based on sensor inputs 2308 and user inputs 2306. For example, a power source 2304 may be configured to supply power to the drive motor 2312 based on input from the controller 2302. In some cases, the controller 2302 may control a voltage being supplied from the power source 2304 to the drive motor 2312. In other embodiments, the controller 2302 may control a perceived voltage being supplied to the drive motor 2312, such as by pulsing the power on and off (e.g., pulse width modulation). In some embodiments, the controller 2302 communicates with a separate motor controller of the drive motor 2312 that then controls the speed of the drive motor 2312 based on a signal from the controller 2302.

The controller 2302 may control a perceived gear ratio of an associated gear drive, such as gear drives 100, 600, 700, 800, 900, 1000, 1100, 1200, 1300, 1400, 1500, 1600, 1700, 1800, 1900, 2000, 2104, 2206, by controlling the regeneration motors 2310. As discussed above, the regeneration motors 2310 may determine a resistance to movement on a second output of the associated gear drive, which may control a perceived gear ratio of the gear drive. Thus, by controlling the movement of the second output through the regeneration motors 2310, the controller 2302 may substantially control a perceived gear ratio of the associated gear drive. Additional regeneration motors 2310 may be used as brakes to stop rotation of wheels or output shafts in the control system 2300 based on signals from the controller 2302.

Embodiments of the disclosure may provide counter-rotating outputs from a single rotating input. By counter-rotating outputs the associated gear box may reduce energy losses in the associated gear box. For example, the torque or moment in mounting structures of the associated gear box may be reduced, with the energy that would be lost to the mounting structure in a conventional gear box instead being transmitted to a counter-rotating output, where the energy may be recaptured or used to drive other components.

Embodiments of the disclosure may further provide a back-feeding gear box with a dynamically changing perceived gear ratio based on a rotational speed of an input into the gear box. A back-feeding gear box may facilitate a reduction in size of a gear box by eliminating additional gears. Furthermore, the back-feeding gear box may utilize additional components to insert additional controllability into the gear box by controlling the rotation of a second output or by balancing power or speed between dual outputs.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A gear drive comprising:
a first planetary gear set and a second planetary gear set;
a first carrier of the first planetary gear set coupled to a rotatable element of the second planetary gear set through an intermediate structure securing the first carrier rotationally to the rotatable element of the second planetary gear set;
a first ring gear of the first planetary gear set rotatably coupled to a second ring gear of the second planetary gear set in a radial and lateral direction through nested intermediate structures that facilitate rotation of the first ring gear relative to the second ring gear;
a first output operatively coupled to the second planetary gear set, the first output configured to rotate in a first direction; and
a second output operatively coupled to the second planetary gear set, the second output configured to rotate in a second direction opposite the first direction;
wherein the intermediate structure and the nested intermediate structures are coaxial with the first output and the second output.

2. The gear drive of claim 1, wherein the first output is coupled to a second ring gear of the second planetary gear set.

3. The gear drive of claim 1, wherein the first output is coupled to a second carrier of the second planetary gear set.

4. The gear drive of claim 1, wherein the second output is coupled to a second ring gear of the second planetary gear set.

5. The gear drive of claim 1, wherein the first carrier of the first planetary gear set is coupled to a second sun gear of the second planetary gear set.

6. The gear drive of claim 1, wherein the first carrier of the first planetary gear set is coupled to a second ring gear of the second planetary gear set.

7. The gear drive of claim 1, further comprising a first input shaft coupled to a first sun gear of the first planetary gear set.

8. A method of transferring motion comprising:
receiving a rotational input in a first direction;
rotating at least one gear of a first planetary gear set in the first direction;
rotating a second at least one gear of the first planetary gear set in a second direction opposite the first direction;
rotating a first output in the first direction;
rotating a second output in the second direction; and
limiting radial and axial movement of a first gear of the first planetary gear set relative to a second gear of a second planetary gear set through a nested intermediate structure in contact with the first gear and the second gear and positioned laterally between the first planetary gear set and the second planetary gear set.

9. The method of claim 8, wherein rotating the at least one gear of the first planetary gear set in the first direction comprises rotating a sun gear of the first planetary gear set in the first direction.

10. The method of claim 8, wherein rotating the second at least one gear of the first planetary gear set in the second direction comprises rotating a ring gear of the first planetary gear set in the second direction.

11. The method of claim 8, further comprising transferring rotation in the first direction from a first element of the first planetary gear set to a second element of the second planetary gear set.

12. A gear drive comprising:
a first rotational input coupled to a first planetary gear set;
a second planetary gear set coupled to the first planetary gear set through at least two intermediate connections;
a first intermediate connection of the at least two intermediate connections coupled between a first element of the first planetary gear set and a second element of the second planetary gear set, the first intermediate connection rotationally securing the first element to the second element, the first intermediate connection configured to rotate relative to the first rotational input; and
a second intermediate connection of the at least two intermediate connections coupled between a third element of the first planetary gear set and a fourth element of the second planetary gear set;
wherein the second intermediate connection comprises a rotatable nested connection securing the third element and the fourth element radially and laterally while facilitating rotation of the third element and the fourth element relative to each other, and each of the first intermediate connection and the second intermediate connection are coaxial with the first rotational input.

13. The gear drive of claim 12, wherein the first element comprises a first sun gear of the first planetary gear set and the second element comprises a second sun gear of the second planetary gear set.

14. The gear drive of claim 12, wherein the first element comprises a first ring gear of the first planetary gear set and the second element comprises a second ring gear of the second planetary gear set.

15. The gear drive of claim 12, wherein the first element comprises a first carrier of the first planetary gear set and the second element comprises a second sun gear of the second planetary gear set.

16. The gear drive of claim 15, wherein the third element comprises a first sun gear of the first planetary gear set and the fourth element comprises a second carrier of the second planetary gear set.

17. The gear drive of claim 12, wherein the first rotational input is coupled to a first carrier of the first planetary gear set.

18. The gear drive of claim 12, wherein the first rotational input is coupled to a first ring gear of the first planetary gear set.

19. The gear drive of claim 12, further comprising a third planetary gear set including a third intermediate connection extending between a fifth element of the third planetary gear set and a sixth element of the first planetary gear set.

20. The gear drive of claim 19, further comprising a fourth intermediate connection operably coupling a seventh element of the third planetary gear set to an eighth element of the second planetary gear set.

* * * * *